(12) United States Patent
Konantambigi et al.

(10) Patent No.: US 11,360,495 B2
(45) Date of Patent: Jun. 14, 2022

(54) INFLATOR WITH AUTOMATIC SHUT-OFF FUNCTIONALITY

(71) Applicant: Stopak India Pvt. Ltd., Karnataka (IN)

(72) Inventors: Sunil Konantambigi, Bangalore (IN); Ryan Fowler, Cape Town (ZA)

(73) Assignee: Stopak India Pvt. Ltd., Bangalore (IN)

( * ) Notice: Subject to any disclaimer, the term of this patent is extended or adjusted under 35 U.S.C. 154(b) by 0 days.

(21) Appl. No.: 17/274,680

(22) PCT Filed: Aug. 13, 2019

(86) PCT No.: PCT/IN2019/050593
§ 371 (c)(1),
(2) Date: Mar. 9, 2021

(87) PCT Pub. No.: WO2020/053876
PCT Pub. Date: Mar. 19, 2020

(65) Prior Publication Data
US 2022/0035386 A1 Feb. 3, 2022

(30) Foreign Application Priority Data

Sep. 12, 2018 (IN) .............................. 201841034471

(51) Int. Cl.
*G05D 7/06* (2006.01)
(52) U.S. Cl.
CPC ......... *G05D 7/0676* (2013.01); *G05D 7/0611* (2013.01); *G05D 7/0694* (2013.01)
(58) Field of Classification Search
None
See application file for complete search history.

(56) References Cited

U.S. PATENT DOCUMENTS

| 3,076,472 | A | | 2/1963 | Newell |
| D206,670 | S | | 1/1967 | Hirsch |
| 3,591,314 | A | | 7/1971 | Day |
| 3,726,307 | A | | 4/1973 | Carman et al. |
| 3,913,844 | A | * | 10/1975 | Petrovic ................. B05B 15/00 239/526 |
| D239,000 | S | | 3/1976 | La Point |

(Continued)

FOREIGN PATENT DOCUMENTS

| AU | 748188 B2 | 5/2002 |
| CN | 201539387 U | 8/2010 |

(Continued)

OTHER PUBLICATIONS

"International Search Report and Written Opinion", PCT/IN2019/050593 (9 pages), dated Dec. 18, 2019.

(Continued)

*Primary Examiner* — Mohammad Ali
*Assistant Examiner* — David Earl Ogg
(74) *Attorney, Agent, or Firm* — Neal, Gerber & Eisenberg LLP

(57) ABSTRACT

Various embodiments of the present disclosure provide an electronic inflator configured to direct pressurized air into an inflatable object, to monitor the air pressure inside the inflatable object, and to automatically stop directing pressurized air into the inflatable object after determining that the air pressure inside the inflatable object has reached a preset pressure.

20 Claims, 21 Drawing Sheets

(56) References Cited

U.S. PATENT DOCUMENTS

| | | | |
|---|---|---|---|
| 4,102,364 A | 7/1978 | Leslie et al. |
| 4,146,069 A | 3/1979 | Angarola et al. |
| 4,146,070 A | 3/1979 | Angarola et al. |
| D256,325 S | 8/1980 | Crooks |
| 4,412,568 A | 11/1983 | Hughes |
| 4,418,737 A | 12/1983 | Goodell et al. |
| 4,574,641 A | 3/1986 | Rosaz et al. |
| 4,583,566 A | 4/1986 | Kalavitz et al. |
| 4,614,479 A | 9/1986 | Liu |
| 4,678,014 A | 7/1987 | Owen et al. |
| 4,782,789 A | 11/1988 | Canzoneri |
| 4,872,492 A | 10/1989 | Mcanally et al. |
| 4,905,742 A | 3/1990 | Mohs |
| D316,020 S | 4/1991 | Fushiya et al. |
| 5,056,558 A | 10/1991 | Rodgers |
| D333,246 S | 2/1993 | Fushiya et al. |
| D334,876 S | 4/1993 | Swetish |
| 5,284,301 A * | 2/1994 | Kieffer .......... B05B 12/0022 239/528 |
| D352,438 S | 11/1994 | Hattori |
| D354,530 S | 1/1995 | Nagel |
| D358,315 S | 5/1995 | Raines |
| 5,454,407 A | 10/1995 | Huza et al. |
| D372,506 S | 8/1996 | Kino |
| 5,566,728 A | 10/1996 | Lange |
| D375,668 S | 11/1996 | Kalousis |
| D377,303 S | 1/1997 | Nagel |
| D396,789 S | 8/1998 | Murray |
| 5,806,572 A | 9/1998 | Voller |
| 5,829,492 A | 11/1998 | Gavronsky et al. |
| 5,862,843 A | 1/1999 | Corbitt |
| D406,737 S | 3/1999 | Farnham |
| D423,519 S | 4/2000 | Bonzer |
| D425,912 S | 5/2000 | Poon |
| D444,365 S | 7/2001 | Bass et al. |
| 6,253,806 B1 | 7/2001 | Sperry et al. |
| D447,033 S | 8/2001 | Izumisawa |
| D456,679 S | 5/2002 | Cheng |
| D457,044 S | 5/2002 | Cheng |
| 6,530,751 B1 | 3/2003 | Song et al. |
| 6,561,236 B1 | 5/2003 | Sperry et al. |
| D481,280 S | 10/2003 | Guiette et al. |
| 6,676,042 B2 | 1/2004 | Howlett et al. |
| D487,899 S | 3/2004 | Poon |
| 6,705,360 B1 * | 3/2004 | Bonzer ............ B60S 5/046 417/313 |
| 6,729,110 B2 | 5/2004 | Sperry et al. |
| 6,793,469 B2 | 9/2004 | Chung |
| 7,063,514 B1 | 6/2006 | Wu |
| D524,135 S | 7/2006 | Happ et al. |
| 7,073,545 B2 | 7/2006 | Smith et al. |
| 7,127,762 B1 | 10/2006 | Lau |
| D552,443 S | 10/2007 | Aglassinger et al. |
| 7,320,347 B2 | 1/2008 | Ramsey et al. |
| D577,973 S | 10/2008 | Wright |
| 7,455,086 B1 | 11/2008 | Elze et al. |
| D593,386 S | 6/2009 | Liao |
| 7,571,500 B2 | 8/2009 | Wu |
| D599,182 S | 9/2009 | Baxter |
| 7,588,425 B2 | 9/2009 | Chung |
| 7,610,929 B2 | 11/2009 | Zielinski et al. |
| 7,644,739 B1 | 1/2010 | Vezzosi et al. |
| 7,677,267 B2 | 3/2010 | Warnick |
| D615,834 S | 5/2010 | Netzler |
| 7,793,687 B2 | 9/2010 | Smith et al. |
| 7,913,724 B2 | 3/2011 | Pansegrouw |
| 7,980,799 B1 | 7/2011 | Rioux et al. |
| 8,162,009 B2 | 4/2012 | Chaffee |
| D660,921 S | 5/2012 | Johnson et al. |
| D660,926 S | 5/2012 | Mastin |
| D670,146 S | 11/2012 | Coley |
| 8,413,278 B2 | 4/2013 | Chaffee |
| D694,268 S | 11/2013 | Ohm et al. |
| D701,737 S | 4/2014 | Poitras |
| D726,771 S | 4/2015 | Pansegrouw et al. |
| D727,706 S | 4/2015 | Chen |
| D760,571 S | 7/2016 | Zwicker |
| D764,551 S | 8/2016 | Fowler et al. |
| 9,434,056 B2 | 9/2016 | Seith et al. |
| D814,262 S | 4/2018 | Khubani |
| 9,969,315 B2 | 5/2018 | Beard et al. |
| D826,022 S | 8/2018 | Lam |
| D834,620 S | 11/2018 | Neir et al. |
| D858,239 S | 9/2019 | Hattori |
| D863,016 S | 10/2019 | Wilmes et al. |
| D875,199 S | 2/2020 | Hu |
| 10,562,436 B2 | 2/2020 | Petrucci et al. |
| D879,154 S | 3/2020 | Huang et al. |
| 10,682,750 B2 | 6/2020 | Zhong et al. |
| D889,230 S | 7/2020 | Wilmes et al. |
| 2005/0087559 A1 | 4/2005 | Smith et al. |
| 2006/0144441 A1 * | 7/2006 | Acosta ............ F16K 11/0716 137/223 |
| 2008/0244858 A1 | 10/2008 | Shaver et al. |
| 2012/0114505 A1 | 5/2012 | Pansegrouw et al. |
| 2013/0139601 A1 * | 6/2013 | Tschantz ............ B05B 1/005 73/700 |
| 2014/0014318 A1 * | 1/2014 | Mail ................ B66F 3/26 166/77.4 |
| 2015/0034196 A1 | 2/2015 | Petrucci et al. |
| 2015/0298307 A1 * | 10/2015 | Wolf ................ B25C 1/008 227/8 |
| 2020/0041030 A1 | 2/2020 | Beard et al. |

FOREIGN PATENT DOCUMENTS

| | | |
|---|---|---|
| EP | 0100286 A1 | 2/1984 |
| EP | 1818228 A2 | 8/2007 |
| WO | 2008099237 A1 | 8/2008 |
| WO | 2009109910 A1 | 9/2009 |
| WO | 2015159211 A1 | 10/2015 |
| WO | WO-2019193398 A1 * | 10/2019 |

OTHER PUBLICATIONS

"SuperFlow Inflation System", Shippers Products, Sheridan, AR, available before Aug. 1, 2018 (2 pages).

Load Runner, "Free-Flo Dunnage Bag Inflation/Deflation Tool", (site visited Jun. 26, 2020), Starboxes.com, URL:<https://www.starboxes.com/free-flo-dunnage-bag-inflation-deflation-tool> (Year: 2020).

Uline, "InflatorGun", (site visited Jun. 26, 2020), Uline.com; URL:<https://www.uline.com/Product/Detail/H-995/Dunnage-Bags/Inflator-Gun> (Year: 2020).

"First Examination Report", from corresponding Indian Patent Application No. IN 201841034471, dated Mar. 21, 2022.

* cited by examiner

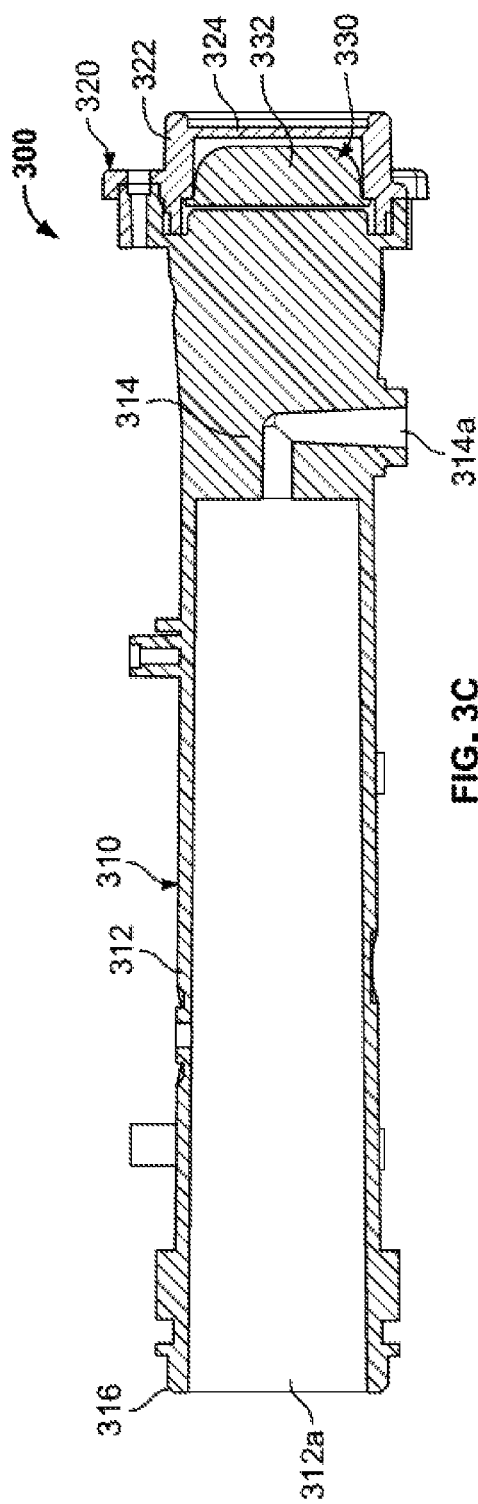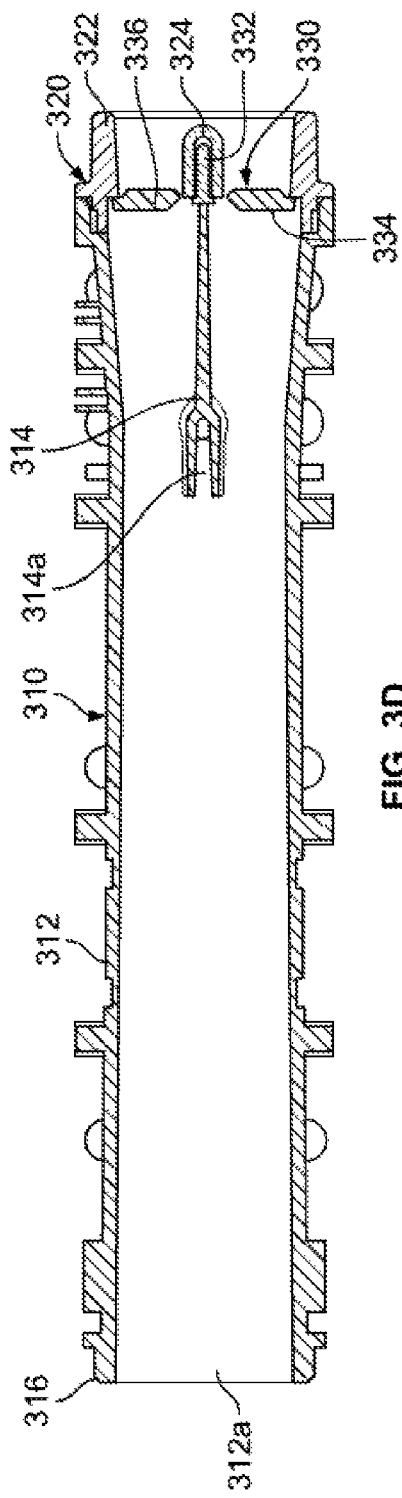
FIG. 3C
FIG. 3D

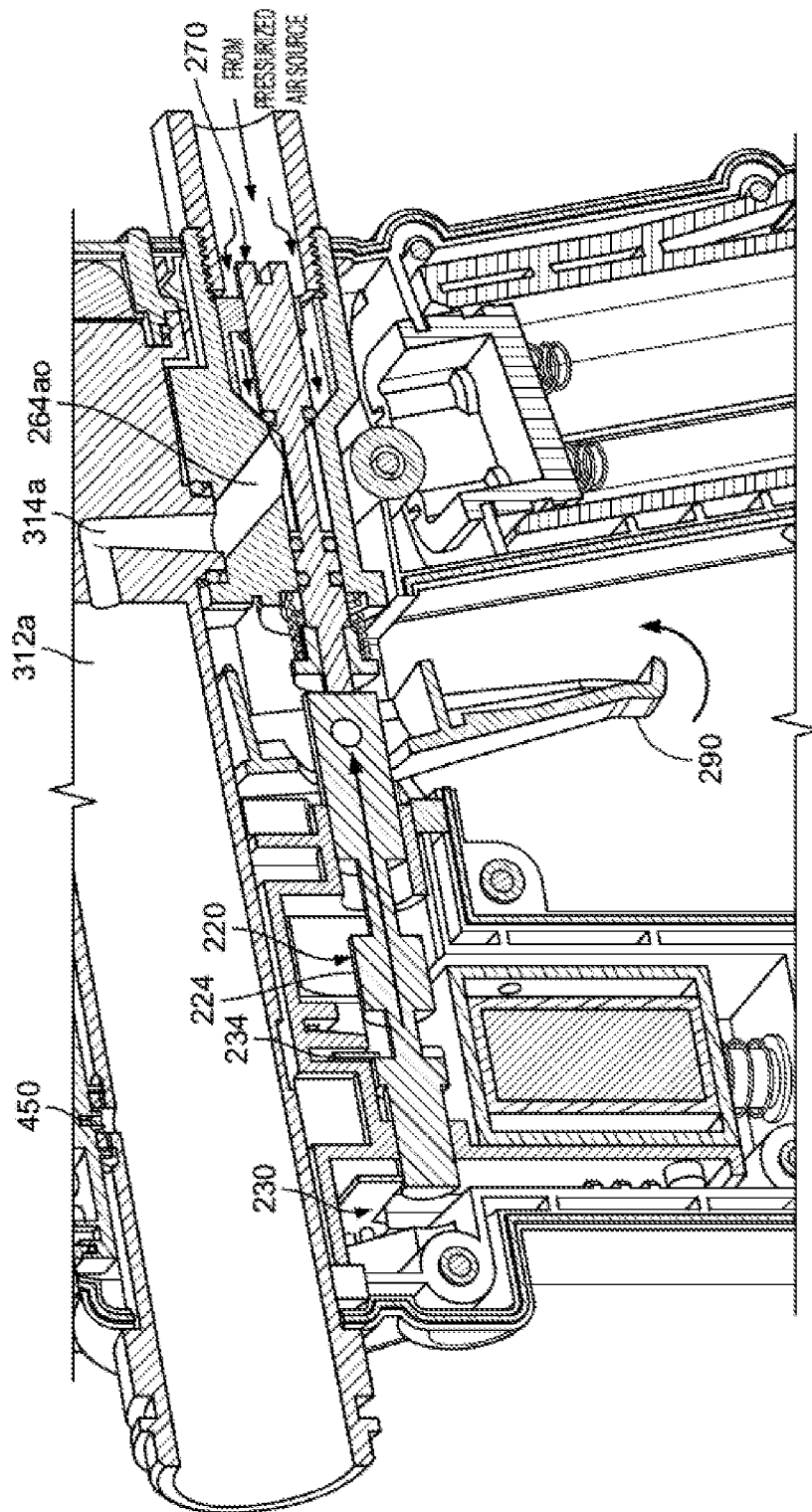

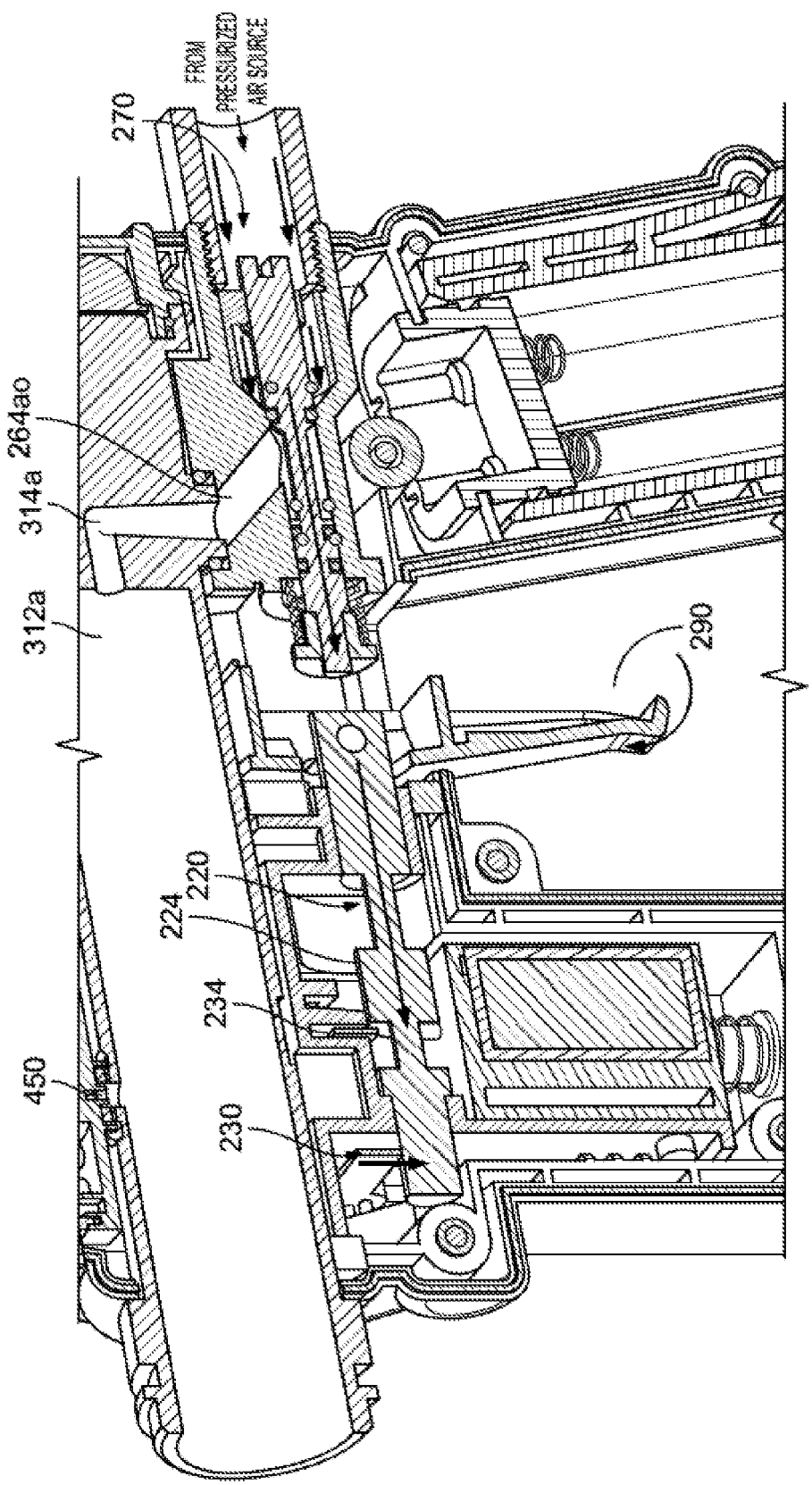

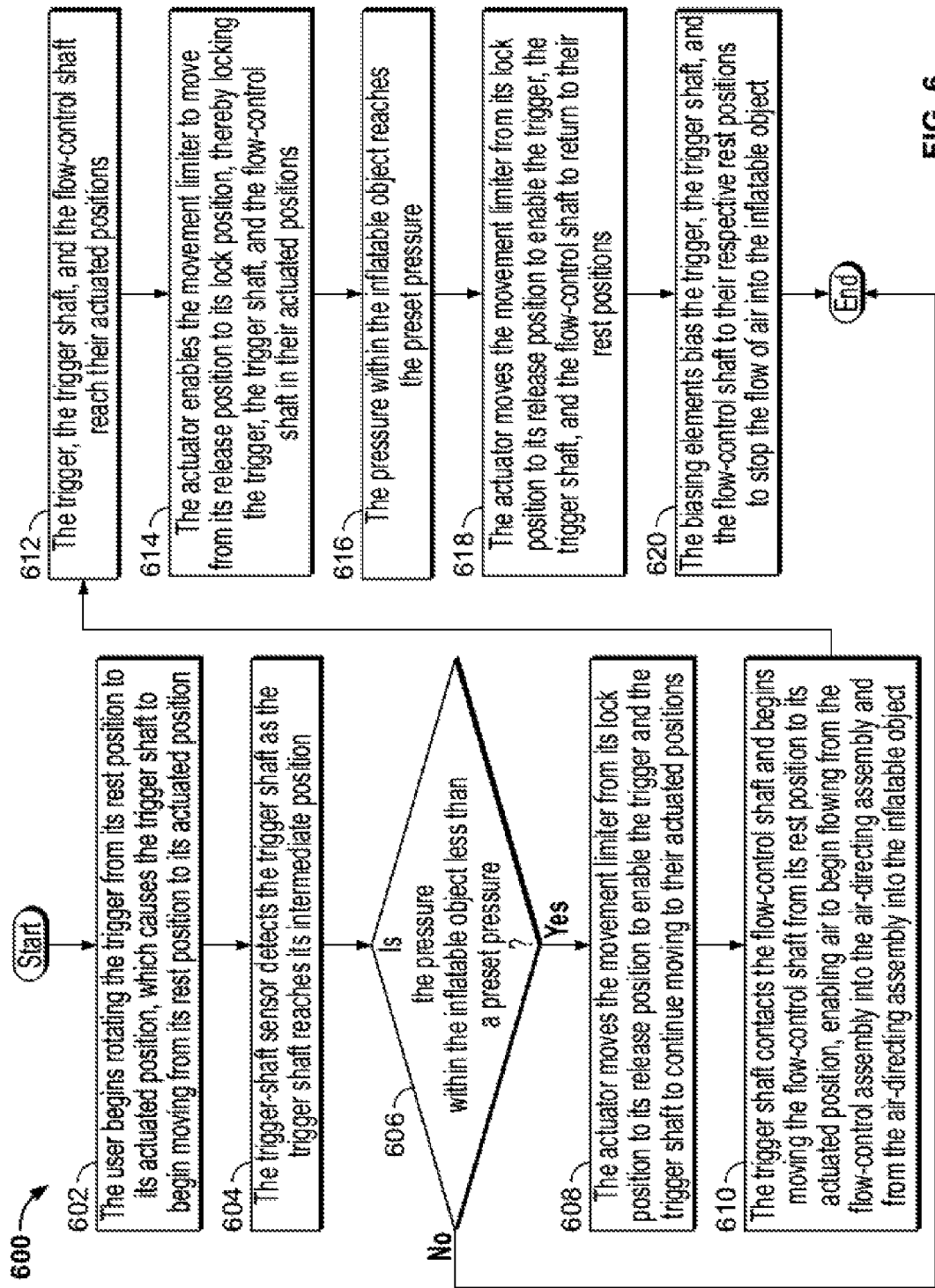

INFLATOR WITH AUTOMATIC SHUT-OFF FUNCTIONALITY

PRIORITY

This application is a national stage application of PCT/IN2019/050593, filed on Aug. 13, 2019, which claims priority to and the benefit of India Patent Application No. 201841034471, filed on Sep. 12, 2018, the entire contents of which are incorporated herein by reference.

CROSS-REFERENCE TO RELATED APPLICATIONS

This application is related to the following commonly owned patent and co-pending patent application: U.S. application Ser. No. 29/664,155, filed Sep. 21, 2018, now U.S. Pat. No. D904,461 S entitled "Inflator"; and U.S. application Ser. No. 29/757,364, filed Nov. 5, 2020, entitled "Inflator".

FIELD

The present disclosure relates to inflators for directing pressurized air into inflatable objects, and more particularly to an inflator configured to automatically stop directing pressurized air into an inflatable object after the air pressure inside the inflatable object has reached a preset pressure.

BACKGROUND

Inflatable dunnage bags are used to stabilize and limit movement of cargo during transportation of cargo containers. Generally, after some or all of the cargo is loaded into a cargo container, uninflated dunnage bags are positioned in the voids between the cargo. The dunnage bags are then inflated to a desired pressure using pressurized air. The inflated dunnage bags fill the voids to limit movement of the cargo during transit.

SUMMARY

Various embodiments of the present disclosure provide an electronic inflator configured to direct pressurized air into an inflatable object, to monitor the air pressure inside the inflatable object, and to automatically stop directing pressurized air into the inflatable object after determining that the air pressure inside the inflatable object has reached a preset pressure.

In various embodiments, an inflator of the present disclosure comprises a housing; an air director supported by the housing and defining an air conduit fluidically connectable to an inflatable object; a pressure sensor configured to detect a pressure within the inflatable object; a trigger movable from a rest position to an actuated position to fluidically connect an air inlet to the air conduit; a movement limiter movable between a lock position in which the movement limiter prevents the trigger from moving from the rest position to the actuated position and a release position in which the movement limiter does not prevent the trigger from moving from the rest position to the actuated position; and a controller configured to cause the movement limiter to move from the lock position to the release position responsive to the pressure within the inflatable object being less than a preset pressure.

In various embodiments, a method of the present disclosure of operating an inflator to inflate an inflatable object comprises detecting, by a pressure sensor, a pressure within the inflatable object; monitoring, by a controller, the pressure within the inflatable object; and responsive to the pressure within the inflatable object being less than a preset pressure, causing, by the controller, a movement limiter to move from: (1) a lock position in which the movement limiter prevents a trigger from moving from a rest position to an actuated position to fluidically connect an air inlet to the air conduit; to (2) a release position in which the movement limiter does not prevent the trigger from moving from the rest position to the actuated position.

BRIEF DESCRIPTION OF THE FIGURES

FIG. 3C is a cross-sectional side-elevational view of the air-directing assembly of FIG. 3A taken substantially along line 3C-3C of FIG. 3A.

FIG. 3D is a cross-sectional top-plan view of the air-directing assembly of FIG. 3A taken substantially along line 3D-3D of FIG. 3A showing the wings of the check valve of the air-directing assembly in their closed positions.

FIGS. 5A-5F are cross-sectional fragmentary perspective views of the flow-control assembly of FIG. 3A during an inflation process.

FIG. 6 is a flowchart of a method of operating the inflator of FIG. 1A during the inflation process.

DETAILED DESCRIPTION

Figure 1A:
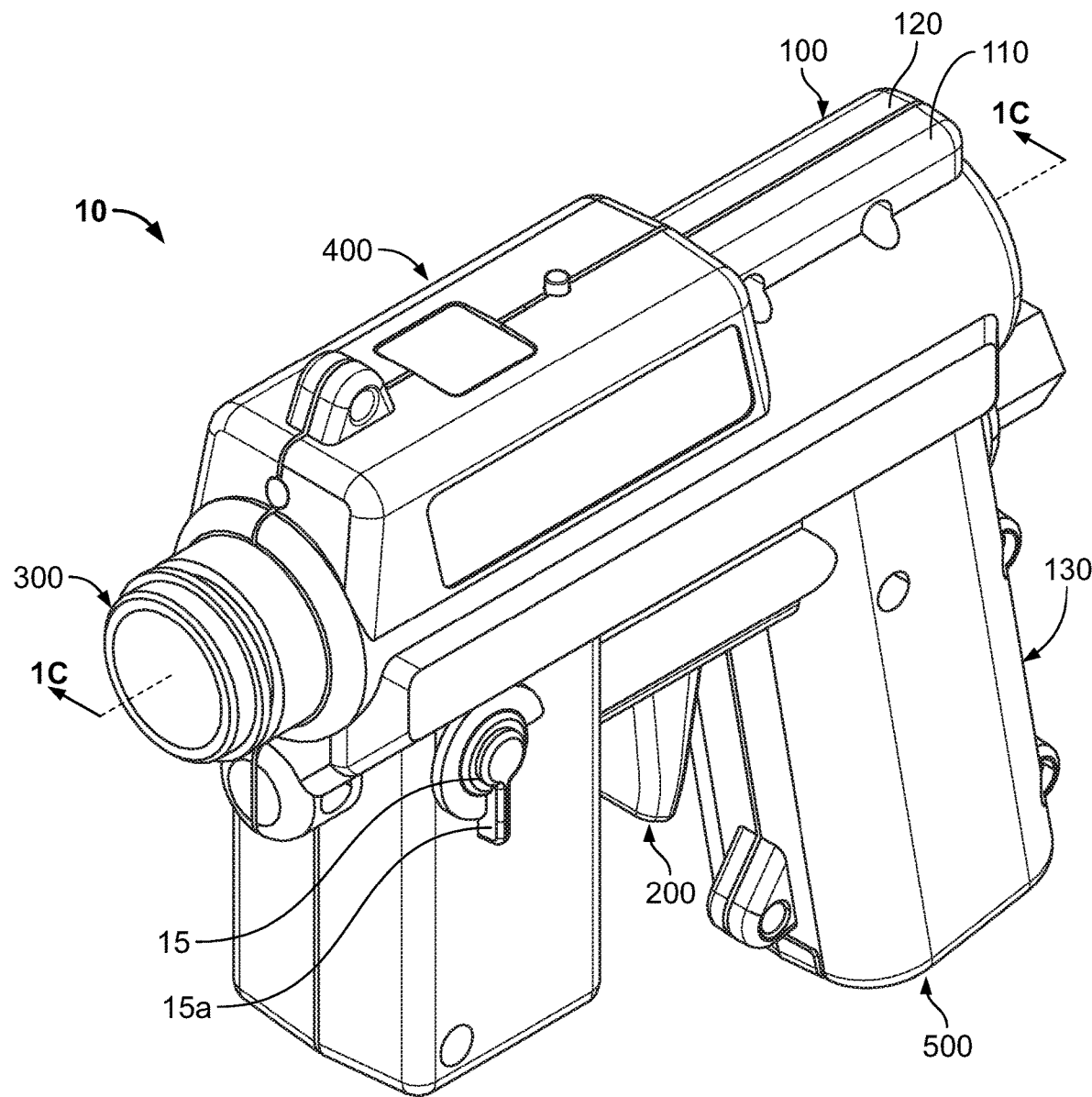
FIGS. 1A and 1B are perspective views of one example embodiment of an inflator of the present disclosure.
Figure 1B:
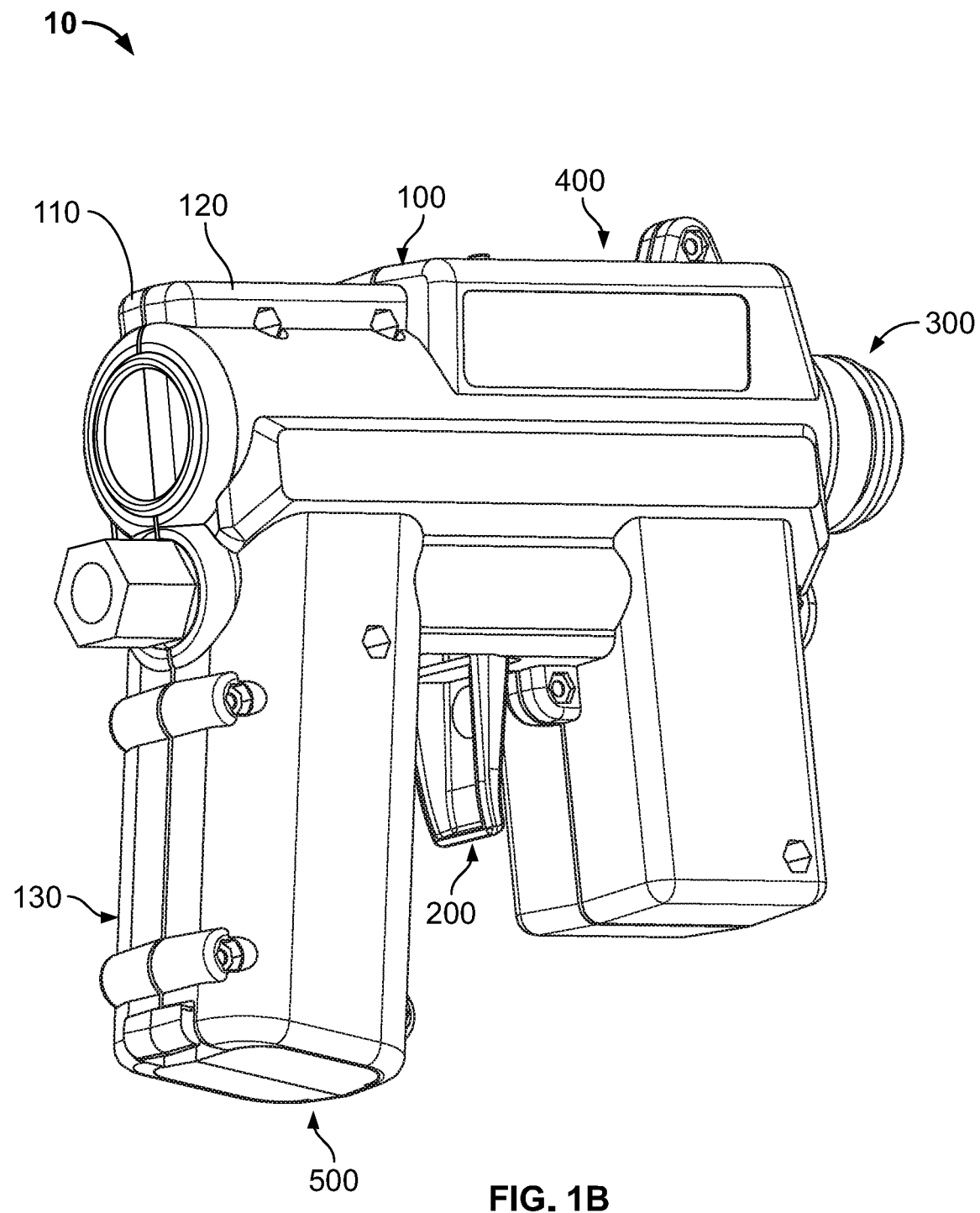

While the systems, devices, and methods described herein may be embodied in various forms, the drawings show and the specification describes certain exemplary and non-limiting embodiments. Not all of the components shown in the drawings and described in the specification may be required, and certain implementations may include additional, different, or fewer components. Variations in the arrangement and type of the components; the shapes, sizes, and materials of the components; and the manners of connections of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as coupled, mounted, connected, etc., are not intended to be limited to direct mounting methods but should be interpreted broadly to include indirect and operably coupled, mounted, connected and like mounting methods. This specification is intended to be taken as a whole and interpreted in accordance with the principles of the present disclosure and as understood by one of ordinary skill in the art.

Various embodiments of the present disclosure provide an electronic inflator configured to direct pressurized air into an inflatable object, to monitor the air pressure inside the inflatable object, and to automatically stop directing pressurized air into the inflatable object after determining that the air pressure inside the inflatable object has reached a preset pressure.

FIGS. 1-4C show one embodiment of the inflator 10 of the present disclosure and the components thereof. FIGS. 5A-5F show how the inflator 10 operates to direct pressurized air into an inflatable object and to automatically stop directing pressurized air into the inflatable object after determining that the air pressure inside the inflatable object has reached a preset pressure. In this example embodiment, the inflatable object is a dunnage bag, though the inflator 10 may be used to inflate any other suitable inflatable object.

Figure 1C:
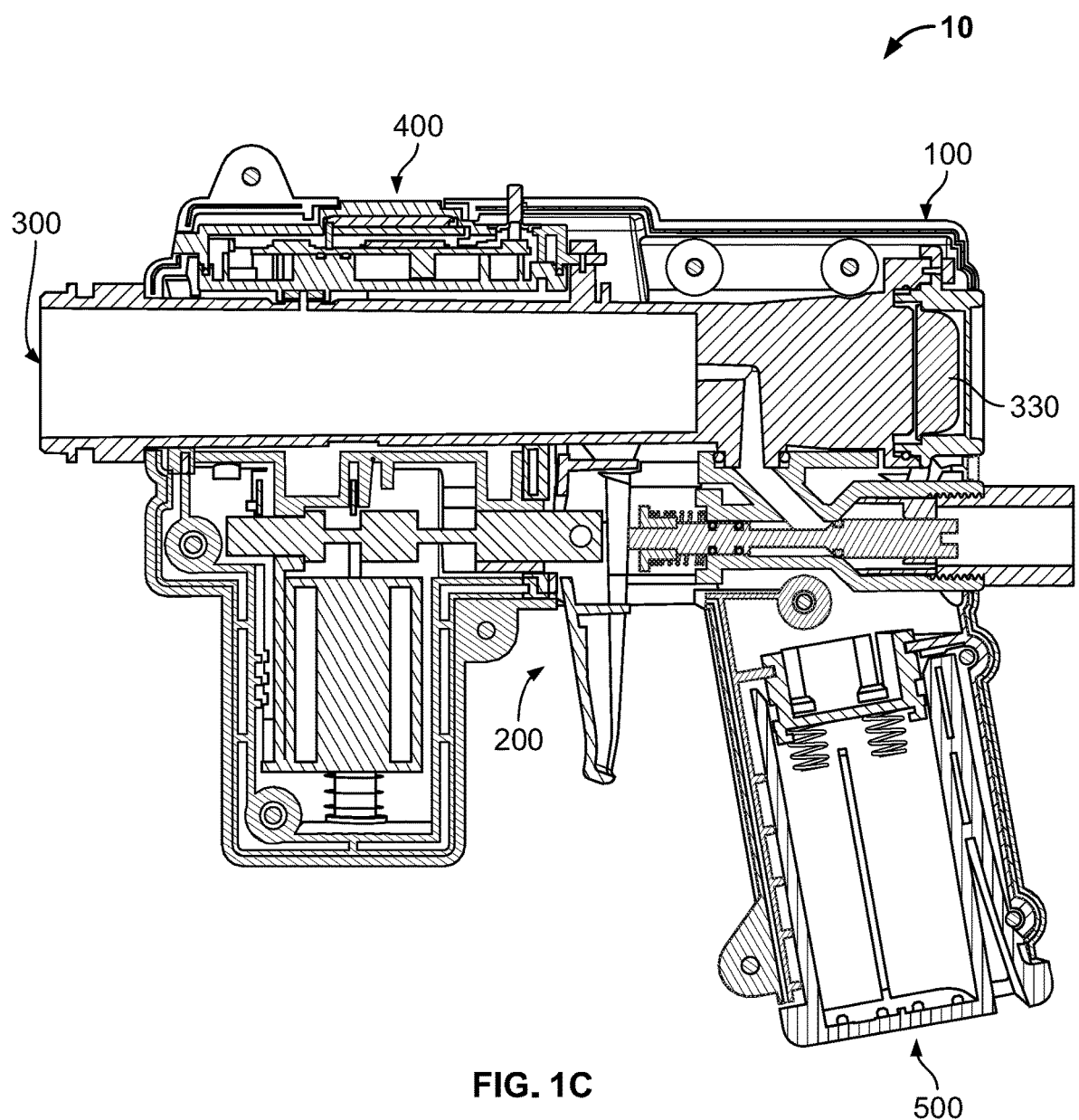
FIG. 1C is a cross-sectional side-elevational view of the inflator of FIG. 1A taken substantially along line 1C-1C of FIG. 1A.
Figure 1D:
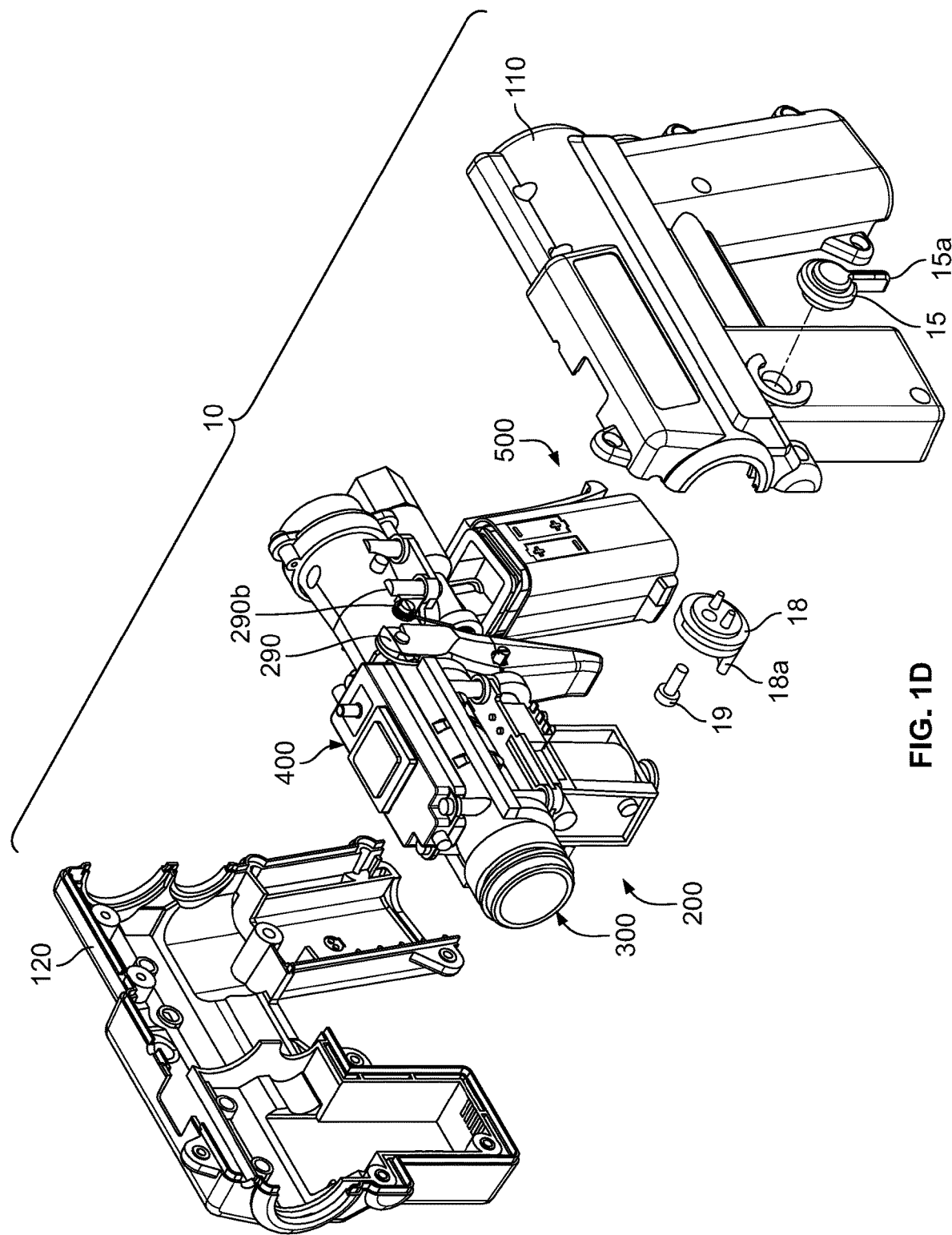
FIG. 1D is a partially exploded perspective view of the inflator of FIG. 1A.

As best shown in FIGS. 1C and 1D, the inflator 10 includes a inflator housing 100, a flow-control assembly 200, an air-directing assembly 300, a control assembly 400, and a power-source assembly 500.

The inflator housing 100 is configured to support and enclose at least part of the flow-control assembly 200, the air-directing assembly 300, the control assembly 400, and the power-source assembly 500. As best shown in FIGS. 1A-1D, the inflator housing 100 includes a first inflator-housing portion 110 and a second inflator-housing portion 120 connectable to one another along a split line (not labeled) via fasteners (or in any other suitable manner). The first and second inflator-housing portions 110 and 120 together form a handle 130 (FIGS. 1A and 1B) sized and shaped to be grasped by a user to operate the inflator 10, as described below.

The flow-control assembly 200 is configured to control the flow of pressurized air from a pressurized air source (not shown) into the air-directing assembly 300 (and therefore into the inflatable object). As best shown in FIGS. 1D and 2A-2F, the flow-control assembly 200 includes a first flow-control-assembly support 210, a trigger shaft 220, a movement limiter 230, a movement-limiter-biasing element 230b, an actuator 240, a trigger-shaft sensor 250, a second flow-control-assembly support 260, a flow-control shaft 270, a flow-control-shaft-biasing element 270b, a flow-control-shaft-biasing-element retainer 285, a flow-control-shaft support 287, a trigger 290, and a trigger-biasing element 290b.

As best shown in FIGS. 2A-2D, the first flow-control-assembly support 210 includes an air-director-mounting portion 212, an actuator-mounting portion 214 connected to and extending downward from the air-director-mounting portion 212, and a trigger-shaft-mounting portion 216 connected to the underside of the air-director-mounting portion 212. The actuator-mounting portion 214 defines a trigger-shaft-receiving opening therethrough (not labeled) sized, shaped, positioned, oriented, and otherwise configured to slidably receive and support part of the trigger shaft 220, as described below. The trigger-shaft-mounting portion 216 defines a trigger-shaft-receiving bore (not labeled) therethrough that is sized, shaped, positioned, oriented, and otherwise configured to slidably receive and support part of the trigger shaft 220, as described below.

Figure 2A:
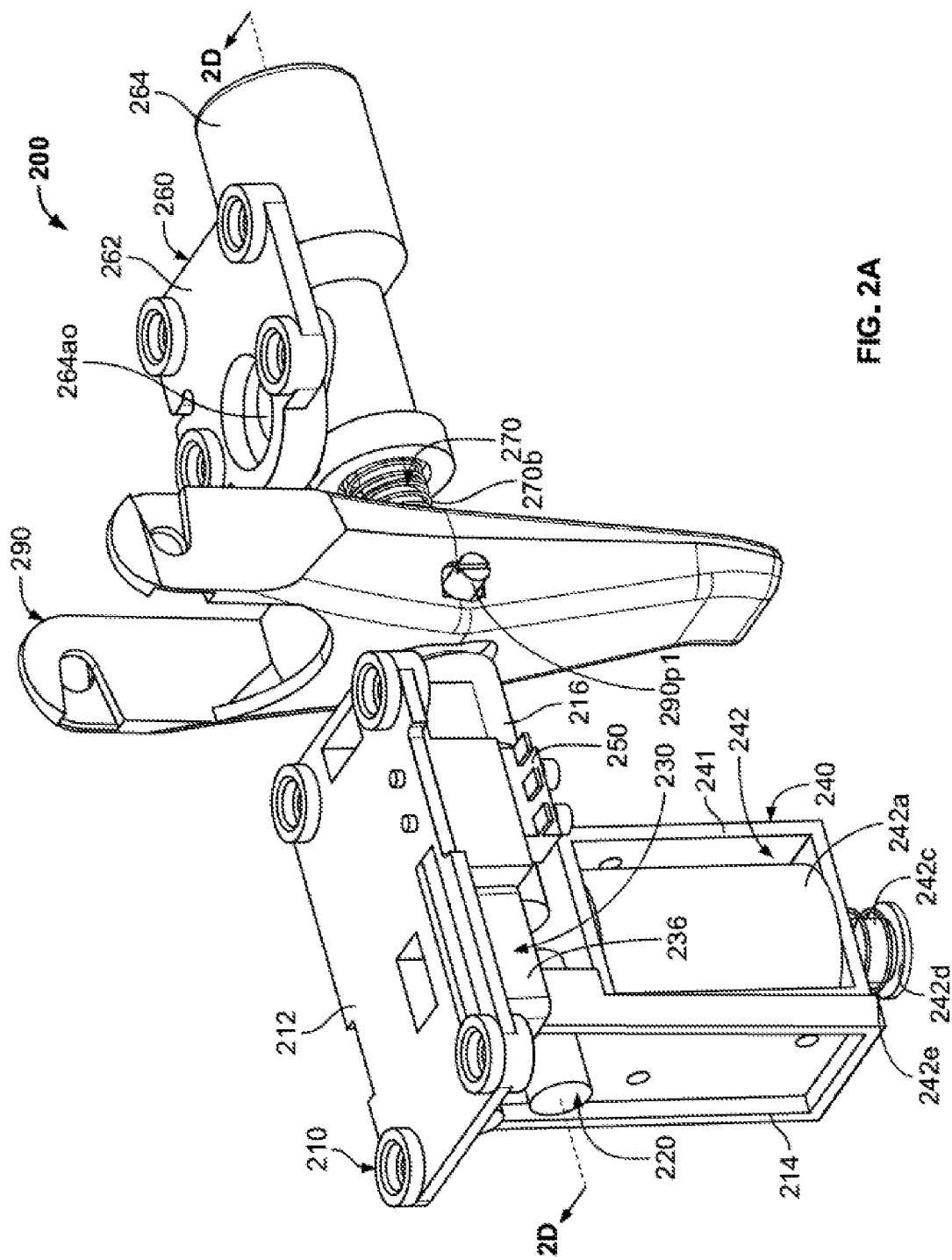
FIGS. 2A and 2B are perspective views of the flow-control assembly of the inflator of FIG. 1A.
Figure 2B:
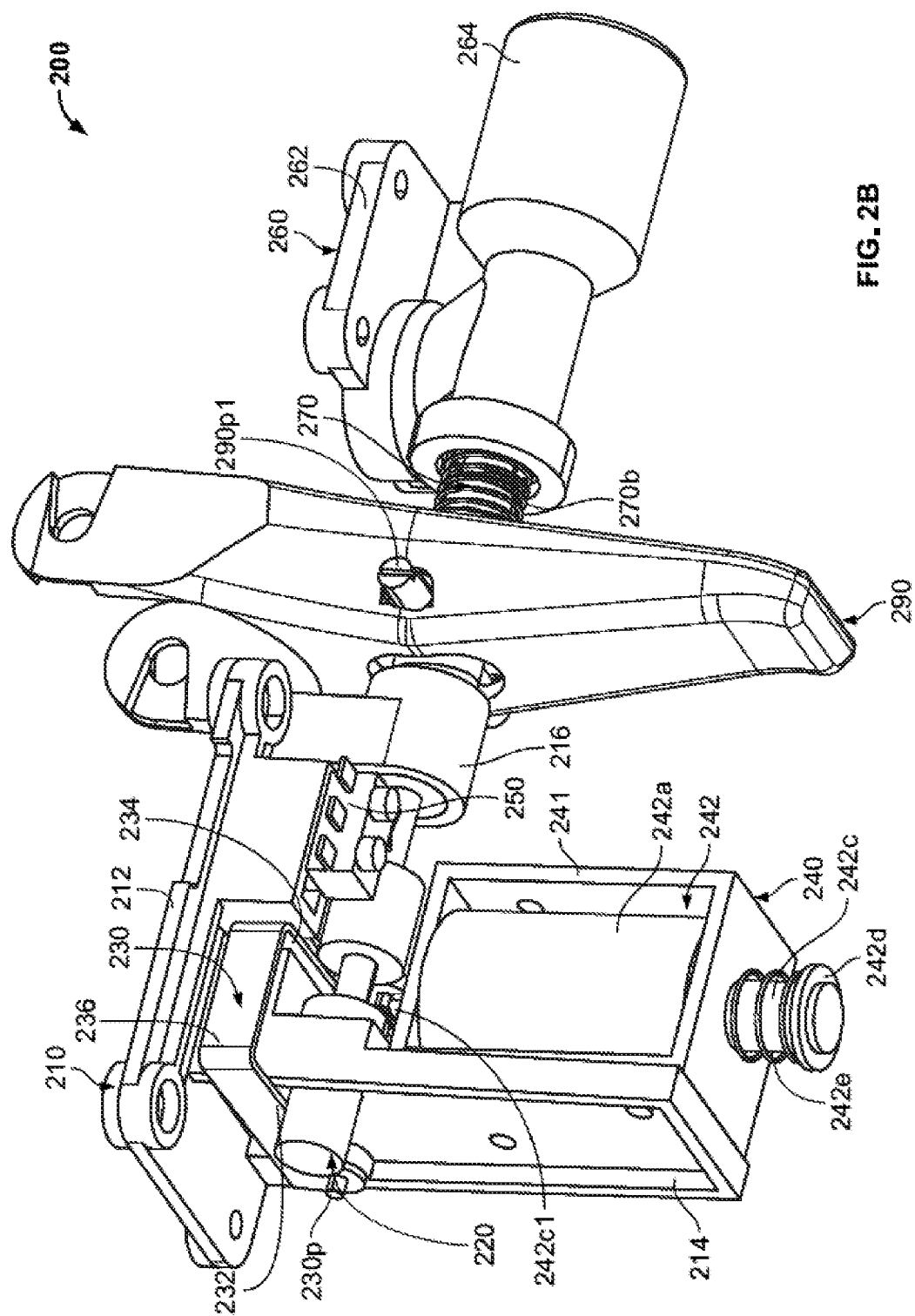
Figure 2C:
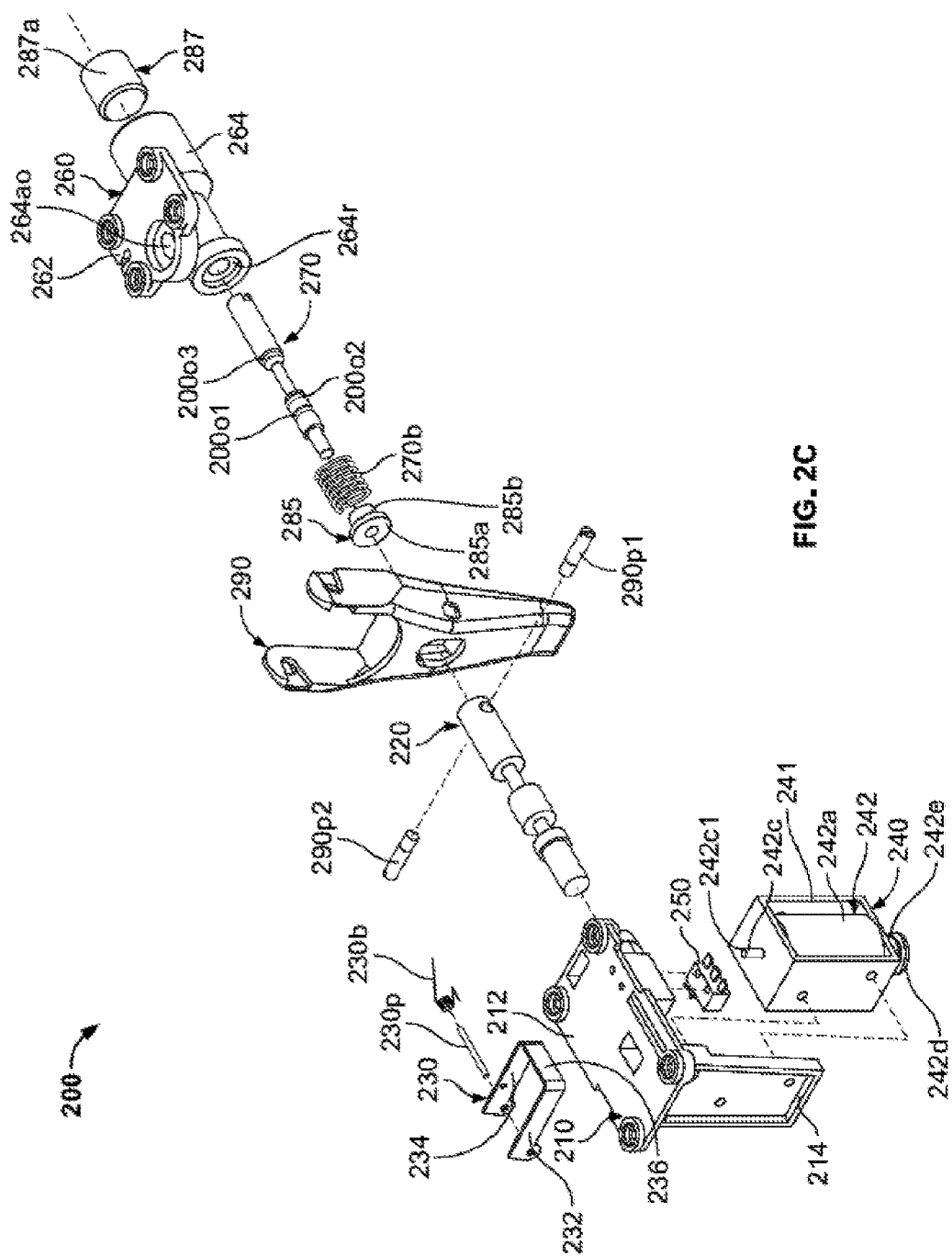
FIG. 2C is an exploded perspective view of the flow-control assembly of FIG. 2A.
Figure 2D:
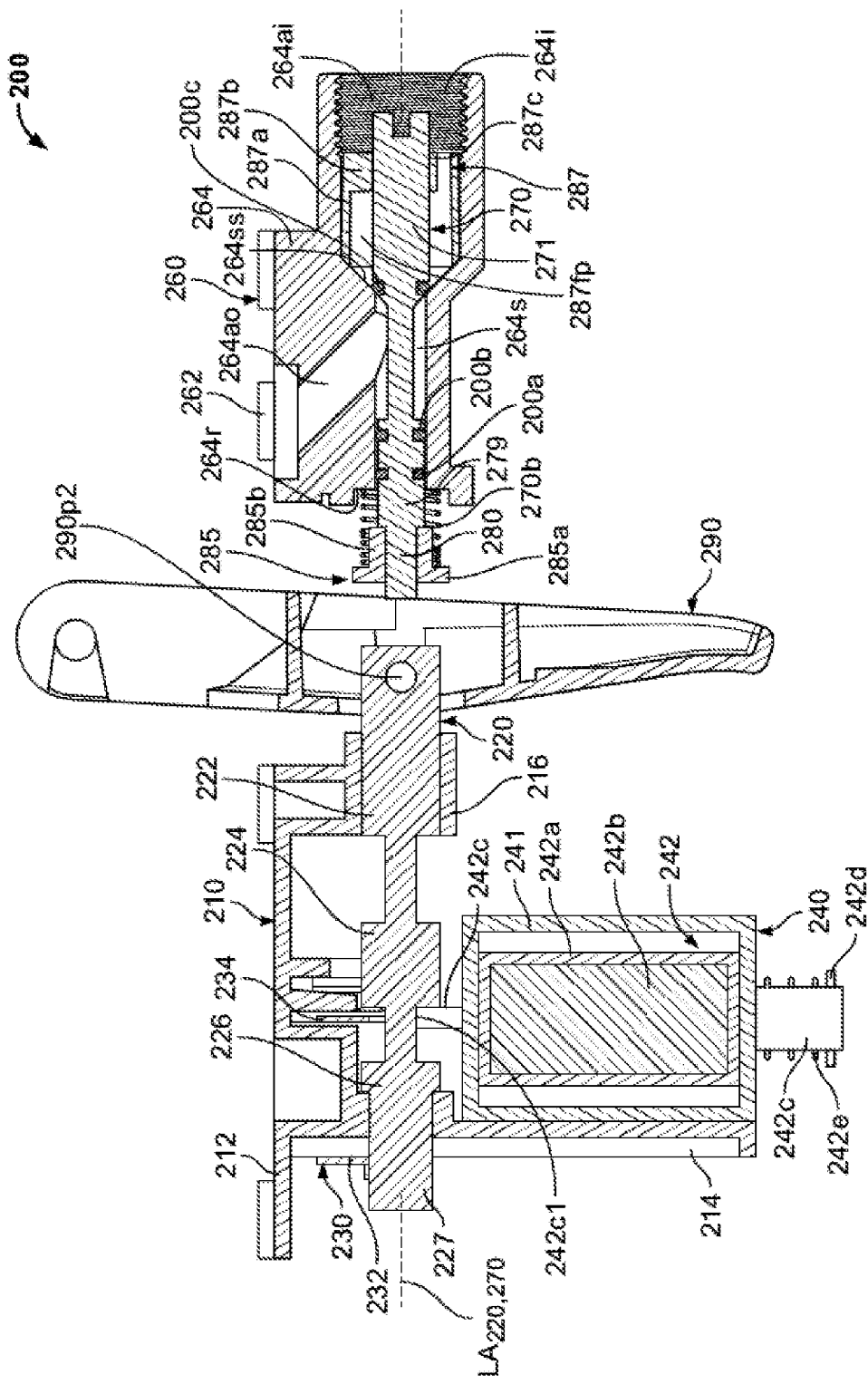
FIG. 2D is a cross-sectional side-elevational view of the flow-control assembly of FIG. 2A taken substantially along line 2D-2D of FIG. 2A.
Figure 2E:
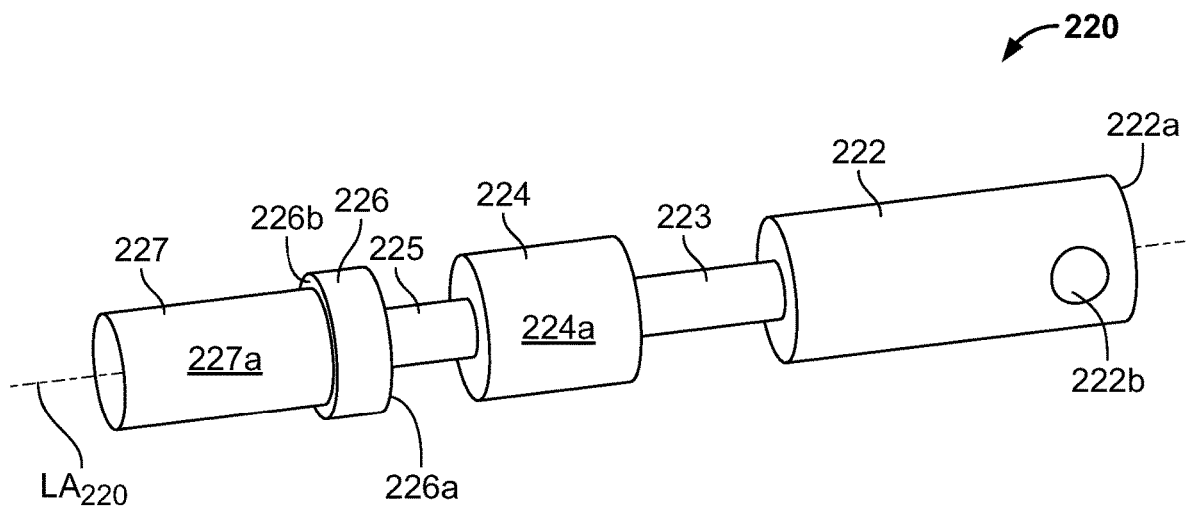
FIG. 2E is a perspective view of the trigger shaft of the flow-control assembly of FIG. 2A.

As best shown in FIG. 2E, the trigger shaft 220 has a longitudinal axis $LA_{220}$ and includes: (1) a cylindrical trigger-connection portion 222 having a circular flow-control-shaft-engaging surface 222a and defining a cylindrical trigger-mounting bore 222b therethrough; (2) a cylindrical first intermediate portion 223 connected to (and having a smaller diameter than) the trigger-connection portion 222; (3) a cylindrical sensed portion 224 connected to (and having a larger diameter than) the first intermediate portion 223; (4) a cylindrical second intermediate portion 225 connected to (and having a smaller diameter than) the sensed portion 224; (5) a cylindrical movement-limiting portion 226 connected to (and having a larger diameter than) the second intermediate portion 224 and having an annular first movement-limiter-engaging surface 226a and an opposing annular second movement-limiter-engaging surface 226b; and (6) a cylindrical end portion 227 connected to (and having a smaller diameter than) the movement-limiting portion 226 and having a cylindrical outer surface 227a.

As best shown in FIGS. 2B and 2C, the movement limiter 230 includes a generally U-shaped body formed from generally parallel and spaced-apart first and second arms 232 and 234 connected by a connector 236.

As best shown in FIGS. 2A-2D, the actuator assembly 240 includes an actuator support 241 and an actuator 242 mounted to the actuator support 241. In this example embodiment, the actuator 242 includes a linear solenoid actuator including: (1) an actuator housing 242a mounted to the actuator support 241; (2) a solenoid 242b (FIG. 2D) within the actuator housing 242a and defining a longitudinal actuator-arm-receiving bore (not shown) therethrough; (3) a cylindrical actuator arm 242c slidably received in the actuator-arm-receiving bore of the solenoid 242b such that a movement-limiter-engaging end 242c1 and an opposing second end (not labeled) of the actuator arm 242c are external to opposite ends of the actuator housing 242a; (4) a biasing-element retainer 242d mounted to the actuator arm 242c near the second end of the actuator arm 242c; and (5) an actuator-arm-biasing element 242e (here, a compression spring) that circumscribes part of the actuator arm 242c and is retained between the biasing-element retainer 242d and the actuator support 241.

The actuator-arm-biasing element 242e biases the actuator arm 242c to a retracted position shown in FIG. 2D. When an electrical current is passed through the solenoid 242b (under control of the controller 400a, described below), the solenoid 242b behaves like an electromagnet and forces the actuator arm 242c to move from its retracted position to an extended position (not shown). This causes the biasing-element retainer 242d—which is attached to the actuator arm 242c—to compress the actuator-arm-biasing element 242e against the actuator support 241, as shown in FIGS. 5C and 5E. When the electrical current is shut off, the actuator-arm-biasing element 242e biases the actuator arm 242c to return to its retracted position. This is merely one example embodiment of the actuator, and any other suitable actuator may be employed to move the movement limiter from its lock position to its release position (as described below with respect to FIGS. 5A-5F).

The trigger-shaft sensor 250, best shown in FIGS. 2A-2C, includes any suitable sensor configured to detect the presence of the sensed portion 224 of the trigger shaft 220. In this example embodiment, the trigger-shaft sensor 250 includes an electromechanical micro-switch that includes a sensing arm 250a biased to a rest position and movable (responsive to being contacted by the sensed portion 224 of the trigger shaft 220, as described below) from the rest position to an actuated position to actuate the trigger-shaft sensor 250. In response, the trigger-shaft sensor 250 is configured to send a corresponding signal to the controller 400a (described below). The trigger-shaft sensor 250 is also configured to send an appropriate signal to the controller 400a responsive to the sensing arm 250a moving from the actuated position back to the rest position (such as in response to the sensed portion 224 moving out of contact with the sensing arm 250a).

As best shown in FIGS. 2A-2D, the second flow-control-assembly support 260 includes an air-director-mounting portion 262 and an air-directing portion 264 connected to the underside of the air-director-mounting portion 262. The air-directing portion 264 includes a body that defines three bores in fluid communication with one another: (1) an air-inlet bore 264ai that includes an air inlet (for receiving air from the pressurized air source); (2) an air-outlet bore 264ao; and (3) a flow-control-shaft-receiving bore 264sr. These three bores have generally cylindrical cross-sections. The air-inlet bore 264ai and the flow-control-shaft-receiving bore 264sr have the same longitudinal axis in this example embodiment. The air-inlet bore 264ai has a larger diameter than the flow-control-shaft-receiving bore 264sr, and the body of the air-directing portion 264 includes a conical sealing surface 264ss at the transition between these two bores. The air-outlet bore 264ao is oriented so its longitudinal axis is transverse to (and in this example embodiment coplanar with) the longitudinal axis of the air-inlet bore 264ai and the flow-control-shaft-receiving bore 264sr.

The flow-control-shaft-receiving bore 264sr is sized, shaped, positioned, oriented, and otherwise configured to receive and support the flow-control shaft 270, as described below. The air-inlet bore 264ai is sized, shaped, positioned, oriented, and otherwise configured to receive and retain the flow-control-shaft support 287 and to be mechanically and fluidically connected (such as via the illustrated threading) to an implement configured to direct pressurized air into the air-inlet bore 264ai. The air-outlet bore 264ao is sized, shaped, positioned, oriented, and otherwise configured to be fluidically connected to the air-directing assembly 300, as described below.

Figure 2F:
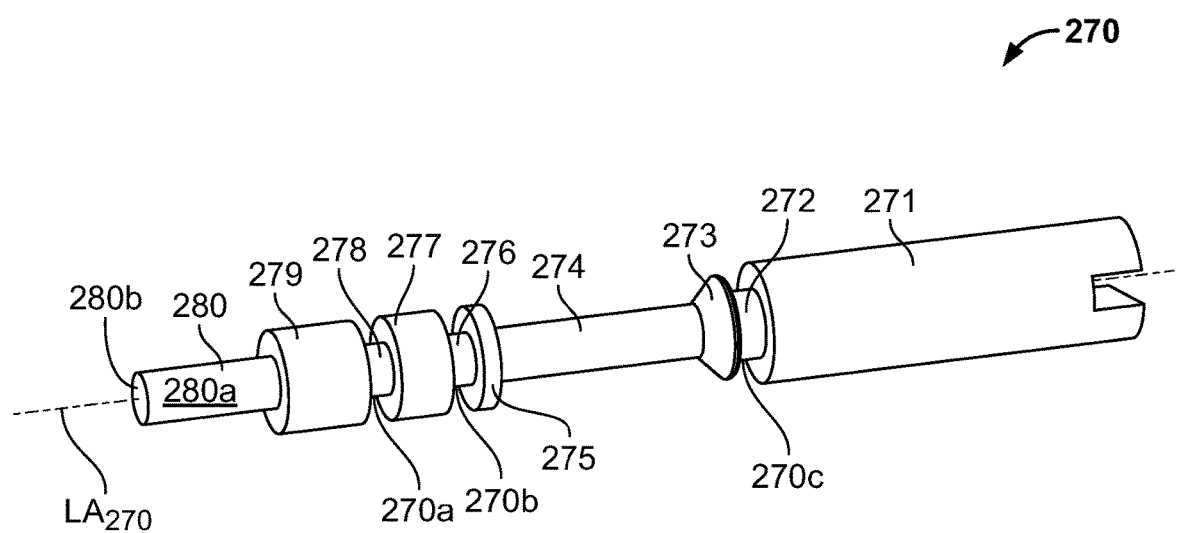
FIG. 2F is a perspective view of the flow-control shaft of the flow-control assembly of FIG. 2A.
Figure 3A:
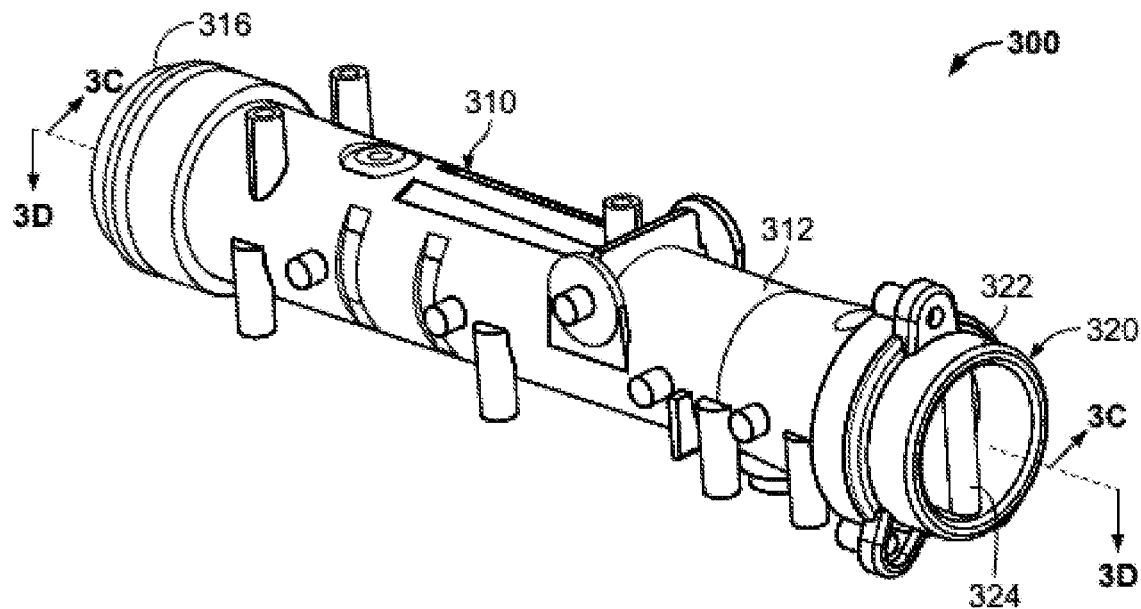
FIG. 3A is a perspective view of the air-directing assembly of the inflator of FIG. 1A.
Figure 3B:
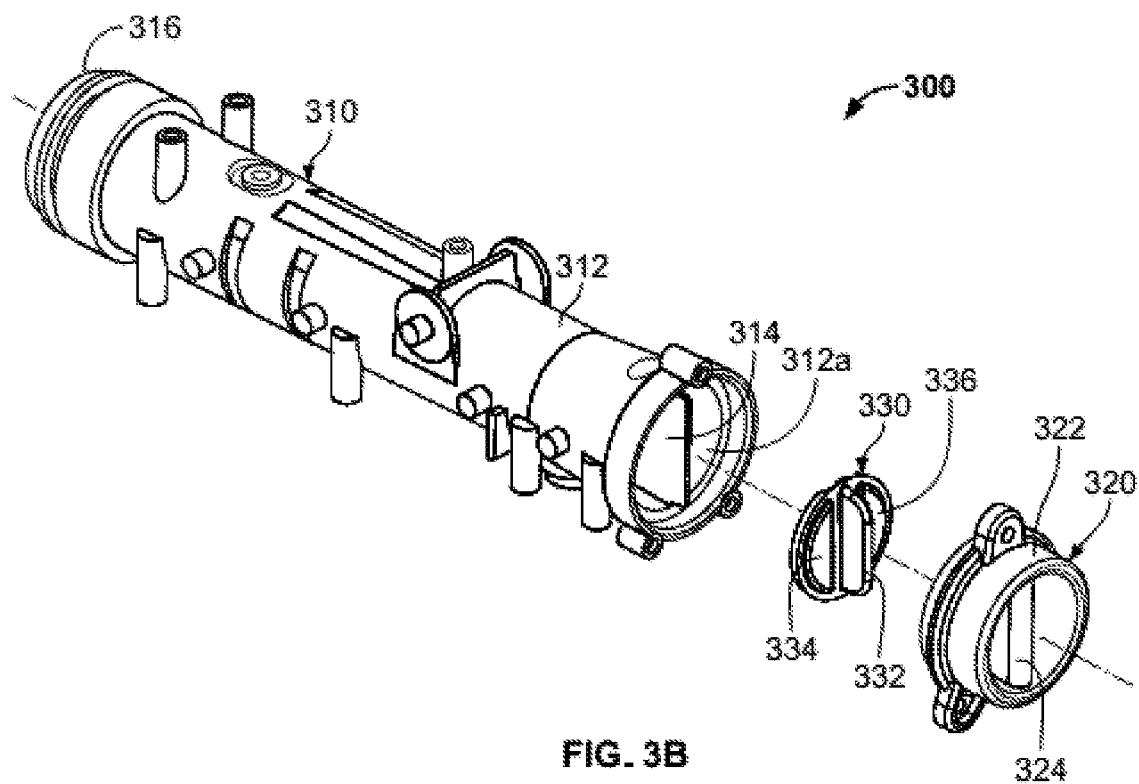
FIG. 3B is an exploded perspective view of the air-directing assembly of FIG. 3A.
Figure 3E:
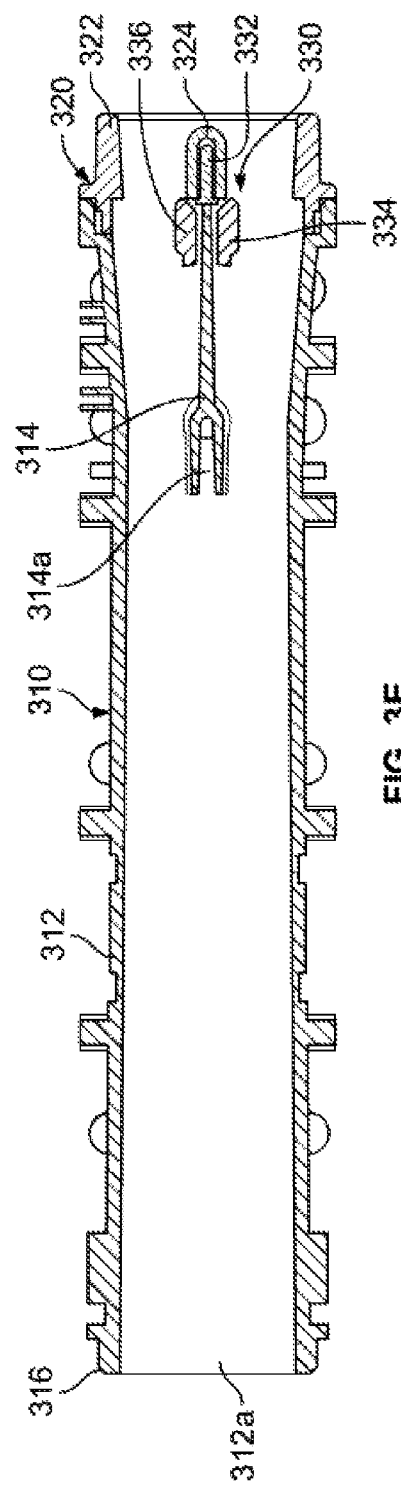
FIG. 3E is a cross-sectional top-plan view of the air-directing assembly of FIG. 3A taken substantially along line 3D-3D of FIG. 3A showing the wings of the check valve of the air-directing assembly in their open positions.

As best shown in FIG. 2F, the flow-control shaft 270 has a longitudinal axis $L_{A270}$ and includes: (1) a generally cylindrical first end portion 271; (2) a cylindrical first intermediate portion 272 connected to (and having a smaller diameter than) the first end portion 271; (3) a conical second intermediate portion 273 connected to (and having a larger major diameter than) the first intermediate portion 272; (4) a cylindrical third intermediate portion 274 connected to (and having a smaller diameter than) the second intermediate portion 273; (5) a cylindrical fourth intermediate portion 275 connected to (and having a larger diameter than) the third intermediate portion 274; (6) a cylindrical fifth intermediate portion 276 connected to (and having a smaller diameter than) the fourth intermediate portion 275; (7) a cylindrical sixth intermediate portion 277 connected to (and having a larger diameter than) the fifth intermediate portion 276; (8) a cylindrical seventh intermediate portion 278 connected to (and having a smaller diameter than) the sixth intermediate portion 277; (9) a cylindrical eighth intermediate portion 270 connected to (and having a larger diameter than) the seventh intermediate portion 278 and having an annular retainer-engaging surface 279a; and (10) a cylindrical second end portion 280 connected to (and having a smaller diameter than) the eighth intermediate portion 270 and including a threaded (not shown for clarity) cylindrical outer surface 280a and a circular trigger-shaft-engaging surface 280b.

A first annular sealing-element-receiving channel 270a is formed between the sixth and eighth intermediate portions 277 and 279. The first sealing-element-receiving channel 270a is sized to receive a first sealing element 200a, best shown in FIGS. 2C and 2D. In this example embodiment, the first sealing element 200a includes an O-ring (though any other suitable sealing element may be employed). A second annular sealing-element-receiving channel 270b is formed between the fourth and sixth intermediate portions 275 and 277. The second sealing-element-receiving channel 270b is sized to receive a second sealing element 200b, best shown in FIGS. 2C and 2D. In this example embodiment, the second sealing element 200b includes an O-ring (though any other suitable sealing element may be employed). A third annular sealing-element-receiving channel 270c is formed between the first end portion 271 and the second intermediate portion 273. The third sealing-element-receiving channel 270c is sized to receive a third sealing element 200c, best shown in FIGS. 2C and 2D. In this example embodiment, the third sealing element 200c includes an O-ring (though any other suitable sealing element may be employed).

As best shown in FIG. 2D, the flow-control-shaft-biasing element 270b includes a compression spring, though any other suitable biasing element may be employed in other embodiments.

As best shown in FIGS. 2C and 2D, the flow-control-shaft-biasing-element retainer 285 includes a body comprising an annular head 285a and an annular base 285b connected to the head 285a. A threaded flow-control-shaft-receiving bore 285c is defined through the body. The flow-control-shaft-receiving bore 285c is sized, shaped, positioned, oriented, and otherwise configured to threadably receive the second end portion 280 of the flow-control shaft 270, as described below.

As best shown in FIGS. 2C and 2D, the flow-control-shaft support 287 includes a body having an annular outer wall 287a and multiple radially inwardly extending arms 287b that support an annular flow-control-shaft-support hub 287c. The flow-control-shaft-support hub 287c defines an opening sized, shaped, positioned, oriented, and otherwise configured to receive and support the first end portion 271 of the flow-control shaft 270. An air flow path 287fp is defined through the flow-control-shaft support 287.

FIG. 2D shows the assembled flow-control assembly 200. The trigger shaft 220 is slidably mounted to the first flow-control-assembly support 210 such that the trigger shaft 220 is movable relative to the first flow-control assembly support 210 along the longitudinal axis $LA_{220}$ between a rest position (FIG. 2D) and an actuated position (FIG. 5D). More specifically: (1) the end portion 227 of the trigger shaft 220 is received in the trigger-shaft-receiving opening defined in the actuator-mounting portion 214 of the first flow-control-assembly support 210 and supported by the actuator-mounting portion 214; and (2) the trigger-connection portion 222 of the trigger shaft 220 is received in the trigger-shaft-receiving bore defined in the trigger-shaft-mounting portion 216 and supported by the trigger-shaft-mounting portion 216.

The trigger 290 is mounted to the trigger shaft 220 near the center of the trigger 290 via pins 290p1 and 290p2 that extend through mounting openings defined in the trigger 290 and are threadably received in the trigger-mounting bore 222b of the trigger-connection portion 222 of the trigger shaft 220. The trigger 290 is pivotably mounted near its upper end to the air director 310 of the air-directing assembly 300 (described below) such that the trigger 290 is rotatable between a rest position (FIG. 2D) and an actuated position (FIG. 5D). The trigger-biasing element 290b (here a torsion spring though any suitable biasing element may be employed) biases the trigger 290 to its rest position. Since the trigger 290 is connected to the trigger shaft 220, the position of the trigger 290 controls the position of the trigger shaft 220. More specifically: (1) when the trigger 290 is in its rest position, the trigger shaft 220 is in its rest position; and (2) when the trigger 290 is in its actuated position, the trigger shaft 220 is in its actuated position. Further, since the trigger-biasing element 290b biases the trigger 290 to its rest position, the trigger-biasing element 290b also biases the trigger shaft 220 to its rest position.

The movement limiter 230 is pivotably mounted to the first flow-control-assembly support 210 such that the movement limiter 230 is pivotable relative to the first flow-control-assembly support 210 between a lock position (FIG. 2D) and a release position (FIGS. 5C and 5E). More specifically, the movement limiter 230 is pivotably mounted to the underside of the air-director-mounting portion 212 of the first flow-control-assembly support 210 via a pivot pin 230p that extends through suitable mounting openings (not shown) defined through the air-director-mounting portion 212 and mounting openings (not labeled) defined through the arms 232 and 234 of the movement limiter 230. The movement-limiter-biasing element 230b (here a torsion spring though any suitable biasing element may be employed) biases the movement limiter 230 to its lock position.

When the movement limiter 230 is in its lock position and the trigger shaft 220 is in its rest position, the movement limiter 230 prevents the trigger shaft 220 from moving from its rest position to its actuated position. Specifically, as shown in FIG. 5B, the second arm 234 of the movement limiter 230 is in the path of the movement-limiting portion 226 of the trigger shaft 220 such that movement of the trigger shaft 220 from its rest position toward its actuated position causes the first movement-limiter-engaging surface 226a of the movement-limiting portion 226 to contact the second arm 234 of the movement limiter 230. This prevents the trigger shaft 220 from moving to its actuated position. When the movement limiter 230 is in its lock position and the trigger shaft 220 is in its actuated position, the movement limiter 230 prevents the trigger shaft 220 from moving from its actuated position to its rest position. Specifically, as shown in FIG. 5D, the second arm 234 of the movement limiter 230 is in the path of the movement-limiting portion 226 of the trigger shaft 220 such that movement of the trigger shaft 220 from its actuated position toward its rest position causes the second movement-limiter-engaging surface 226b of the movement-limiting portion 226 to contact the second arm 234 of the movement limiter 230. This prevents the trigger shaft 220 from moving to its rest position. When the movement limiter 230 is in its release position, the trigger shaft 220 can freely move between its rest and actuated positions.

The actuator assembly 240 is mounted to the actuator-mounting portion 214 of the first flow-control-assembly support 210 such that the movement-limiter-engaging end 242c1 of the actuator arm 242c of the actuator 242 of the actuator assembly 240 can (directly or indirectly) contact the movement limiter 230 (such as one of the arms 232 and 234 or the connector 236) when the actuator arm 242c is in extended position to move the movement limiter 230 from its lock position to its release position. Put more generally, the actuator 242 is operably connected to the movement limiter 230 to move the movement limiter 230 from its lock position to its release position.

The trigger-shaft sensor 250 is mounted to the first flow-control-assembly support 210 such that the trigger-shaft sensor 250 can detect when the trigger shaft 220 has moved from its rest position to an intermediate position (before the trigger shaft reaches its actuated position). More specifically, the trigger-shaft sensor 250 is mounted to the underside of the air-director-mounting portion 212 of the first flow-control-assembly support 210 and positioned such that the sensed portion 224 of the trigger shaft 220 contacts and actuates the sensing arm 250a of the trigger-shaft sensor 250 as the trigger shaft 220 reaches the intermediate position. In this example embodiment, the trigger shaft 220 reaches the intermediate position just before or as the first movement-limiter-engaging surface 226a of the movement-limiting portion 226 of the trigger shaft 220 reaches the second arm 234 of the movement limiter 230.

The flow-control-shaft support 287 is threadably received in the air-outlet bore 264ao of the air-directing portion 264 of the second flow-control-assembly mounting support 260 such that the opening defined in the flow-control-shaft-support hub 287c is generally aligned with the flow-control-shaft-receiving bore 264sr and the air flow path 287fp is in fluid communication with the air-inlet bore 264ai defined in the air-directing portion 264.

The flow-control shaft 270 is slidably mounted to the second flow-control-assembly support 260 such that the flow-control shaft 270 is movable relative to the second flow-control assembly support 260 along the longitudinal axis $LA_{270}$ between a rest position (FIG. 2D) and an actuated position (FIG. 5D). More specifically: (1) the first end portion 271 of the flow-control shaft 270 is received in the opening defined in the flow-control-shaft-support hub 287c of the flow-control-shaft support 287 and supported by the flow-control-shaft support 287; and (2) the second end portion 280 of the flow-control shaft 270 is received in the flow-control-shaft-receiving bore 264sr defined in the second flow-control-assembly support 260 and supported by the second flow-control-assembly support 260.

The first and second sealing elements 200o1 and 200o2 sealingly engage the wall of the second flow-control-assembly support 260 that define the flow-control-shaft-receiving bore 264sr when the flow-control shaft 270 is in its rest and actuated positions. The third sealing element 200o3 sealingly engages the sealing surface 264ss of the second flow-control-assembly support 260 when the flow-control shaft 270 is in its rest position such that the air-inlet bore 264ai and the air flow path 287fp are not in fluid communication with the air-outlet bore 264ao. The third sealing element 200o3 is spaced-apart from (i.e., does not sealingly engage) the sealing surface 264ss when the flow-control shaft 270 is in its actuated position such that the air-inlet bore 264ai and the air flow path 287fp are in fluid communication with the air-outlet bore 264ao.

The flow-control-shaft-biasing-element retainer 285 is threadably mounted to the second end portion 280 of the flow-control shaft 270. The flow-control-shaft-biasing element 270b circumscribes the body 285b of the flow-control-shaft-biasing-element retainer 285 and part of the second end portion 280 of the flow-control shaft 270 and is retained between an underside (not labeled) of the head 285a of the flow-control-shaft-biasing-element retainer 285 and a retaining surface 264r of the second flow-control-assembly support 260. The flow-control-shaft-biasing element 270b biases the flow-control shaft 270 to its rest position.

The first and second flow-control-assembly supports 210 and 260 are mounted to the underside of the air director 310 of the air-directing assembly 300 (described below) such that the longitudinal axes $LA_{220}$ and $LA_{270}$ of the trigger shaft 220 and the flow-control shaft 270 are coaxial (i.e., such that the trigger shaft 220 and the flow-control shaft 270 have the same longitudinal axis).

The air-directing assembly 300 is configured to receive pressurized air from the flow-control assembly 200 and to direct that pressurized air into the inflatable object. As best shown in FIGS. 3A-3D, the air-directing assembly 300 includes an air director 310, an end cap 320, and a check valve 330.

The air director 310 includes an elongated annular body 312, a partition 314, and a nozzle 316. The partition 314 extends radially across the inner diameter of the body 312 and is longitudinally positioned near a rear end of the body 312. As best shown in FIGS. 3C and 3D, the partition 314 defines an L-shaped air conduit 314a having a generally circular cross-section that is sized, shaped, positioned, oriented, and otherwise configured to route pressurized air received from the flow-control assembly 200. The nozzle 316 is positioned at an opposite front end of the body 312 and is configured such that an inflation head (not shown) fluidically connectable to the inflatable object can be mechanically mounted to the nozzle 316.

The end cap 320 includes a body having an annular outer wall 322 and a check-valve-retaining element 324. The check-valve-retaining element 324 extends radially across the inner diameter of the outer wall 322 and defines a groove (not labeled) sized to receive part of the check valve 330.

The check valve 330 includes an elastomeric body that has a mounting portion 332, a first wing 334 on one side of the mounting portion 332, and a second wing 336 on an opposite side of the mounting portion 332. The wings 334 and 336 are pivotable relative to the mounting portion 332 between open and closed positions.

As best shown in FIGS. 3C and 3D, the end cap 320 is mounted to the rear end of the air director 310 to retain the check valve 330 in place. Specifically, the mounting portion 332 of the check valve 330 is received in the groove of the check-valve-retaining element 324 of the end cap 320 and retained in place via interference fit. The end cap 320 (with the check valve 330 mounted thereto) is attached to the rear end of the body 312 of the air director 310 (such as via fasteners) such that the rear end of the partition 314 is adjacent the mounting portion 332 of the check valve 330 to prevent the check valve 330 from accidentally being removed from the end cap 320.

FIG. 3D shows the first and second wings 334 and 336 of the check valve 330 in their closed positions. When in their closed positions, the first and second wings 334 and 336 engage an annular lip (not labeled) of the end cap 320 and prevent air from flowing out of the rear opening of the air conduit 312a (i.e., from left to right in FIG. 3D). The first and second wings 334 and 336 are movable (such as via the Venturi effect, as explained below) from their closed positions to open positions shown in FIG. 3E.

The air director 310 and the end cap 320 together define an air conduit 312a that extends from the openings formed in the end cap 320 (which are closed when the wings 334 and 336 of the check valve 330 are in their closed positions and open when the wings are in their open positions) to the opening formed in the nozzle 316. The air conduit 314a defined in the partition 314 is in fluid communication with the air conduit 312a.

Figure 4A:
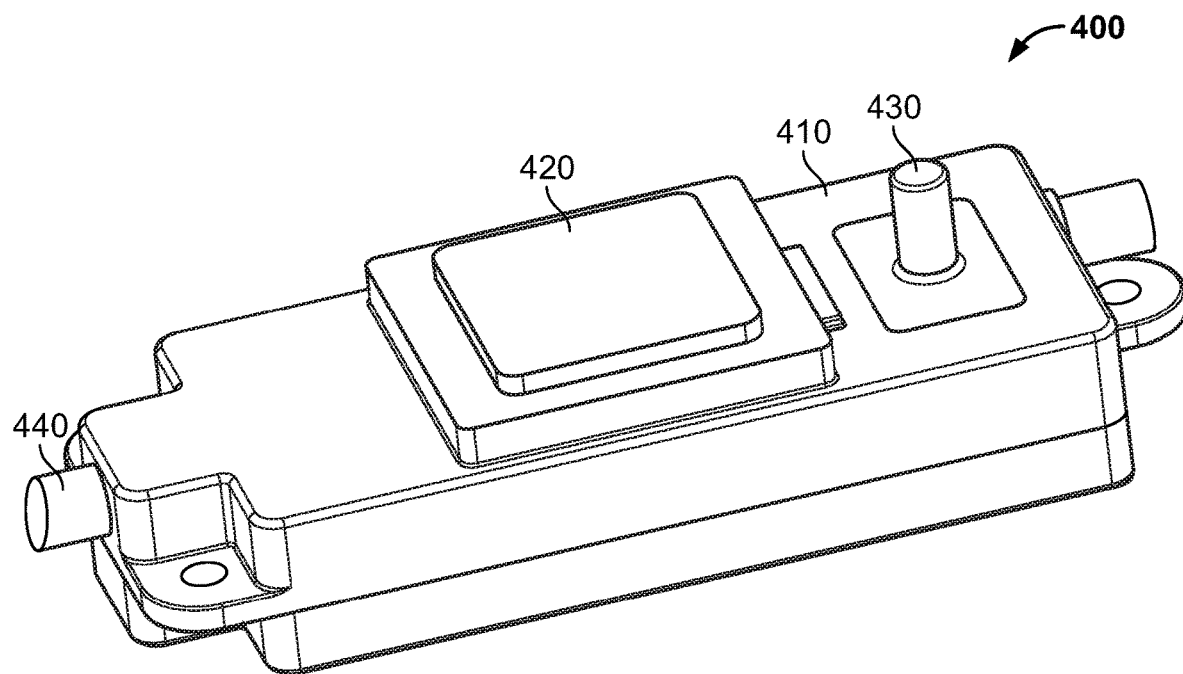
FIGS. 4A and 4B are perspective views of the control module of the inflator of FIG. 1A.
Figure 4B:
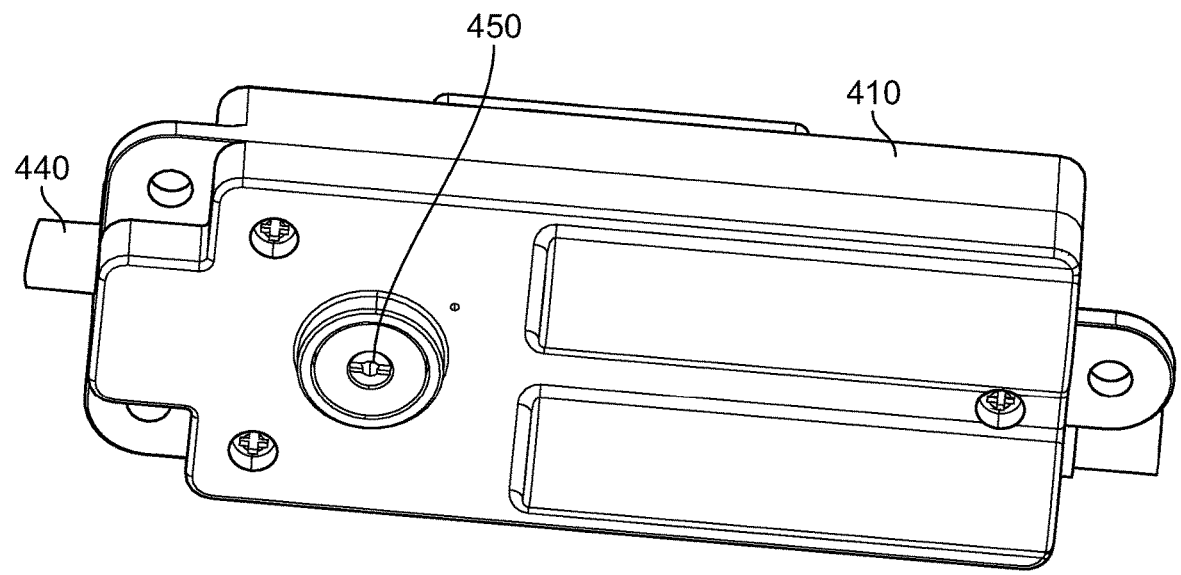
Figure 4C:
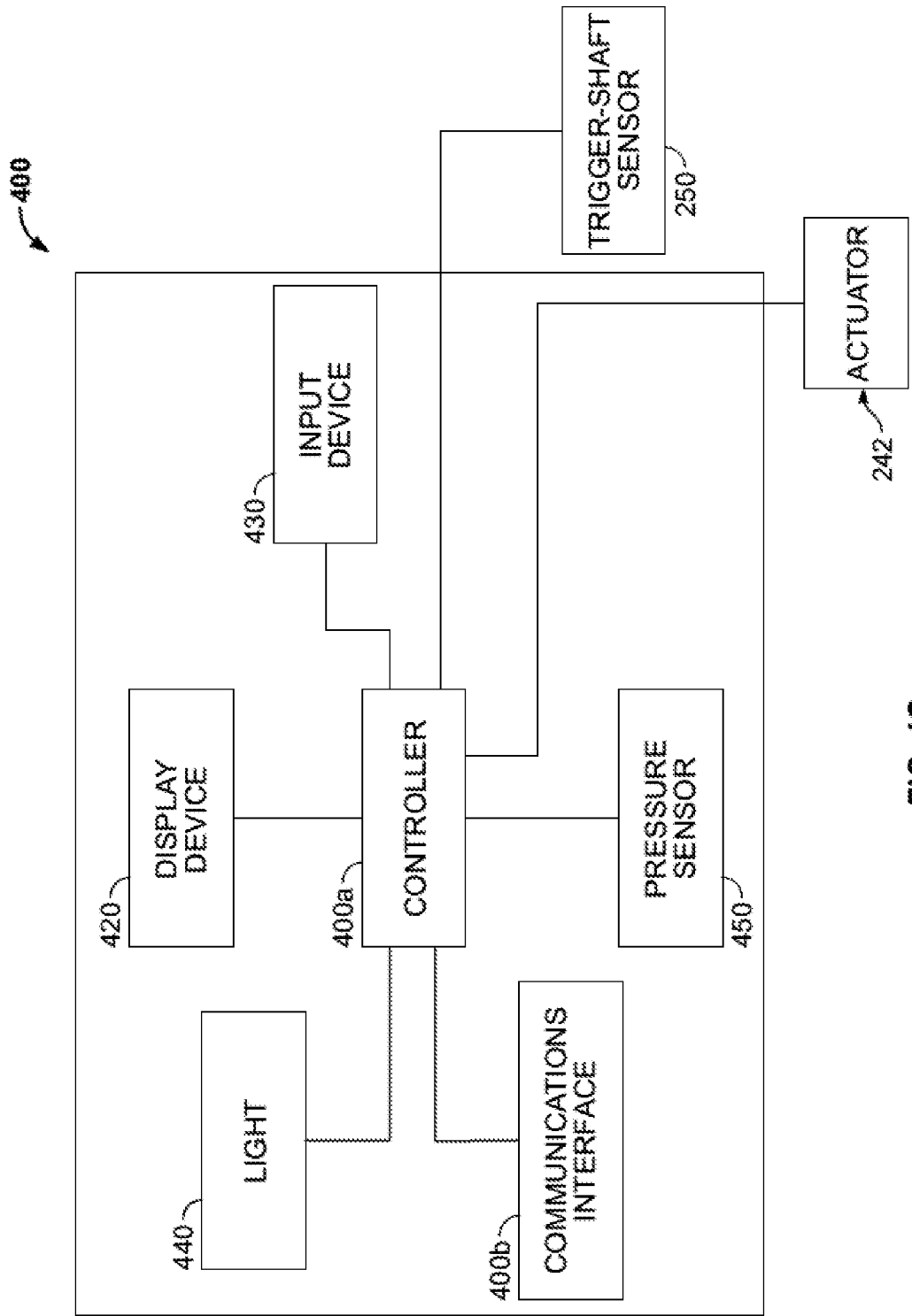
FIG. 4C is a block diagram showing certain components of the flow-control assembly of FIG. 3A and the control module of FIG. 4A.

The control assembly 400 is configured to control the automatic shut-off functionality of the inflator 10, to output information to the user, to receive inputs from the user, and to communicate with an external device. As best shown in FIGS. 4A-4C, the control assembly 400 includes a controller 400a, a communications interface 400b, a housing 410, a display device 420, an input device 430, a light 440, and a pressure sensor 450.

The controller 400a is enclosed within the housing 410 and may be any suitable type of controller (such as a programmable logic controller) that includes any suitable processing device(s) (such as a microprocessor, a microcontroller-based platform, an integrated circuit, or an application-specific integrated circuit) and any suitable memory device(s) (such as random access memory, read-only memory, or flash memory). The memory device(s) stores instructions executable by the processing device(s) to control operation of certain components of the inflator 10.

The communications interface 400b is enclosed within the housing 410 and configured to establish and facilitate bidirectional communication between the controller 400a and an external device, such as a computing device (e.g., a laptop computer, a tablet computer, or a mobile phone, not shown). In operation, once the communications interface 400b establishes communication with the computing device, the controller 400a can send data (via the communications interface 400b) associated with the operation of the inflator 10 to the external device and receive data (via the communications interface 400b) from the external device. The communications interface 400b may be any suitable wireless communication interface having any suitable architecture and utilizing any suitable protocol such as, but not limited to: 802.11 (WiFi); 802.15 (including Bluetooth); 802.16 (WiMax); 802.22; cellular standards such as CDMA, CDMA2000, and WCDMA; Radio Frequency (e.g., RFID); infrared; and Near-Field Communication (NFC) protocols.

The display device 420 is supported by the housing 410 and may include any suitable type of display device, such as (but not limited to): a plasma display, a liquid-crystal display (LCD), a display based on light-emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. The display device 420 may be of any suitable size, shape, and configuration.

The input device 430 is supported by the housing 410 and configured to receive an input from a user. In this example embodiment, the input device 430 includes a mechanical pushbutton. The input device 430 may be any other suitable input device such as, but not limited to, a mechanical switch, a mechanical dial, or a touch panel.

The light 440 is supported by the housing 410 and is any suitable type of light, such as a light-emitting diode.

The pressure sensor 450 is supported by the housing 410 and is any suitable type of pressure sensor, such as a silicon micromachined piezoresistive pressure sensing chip that provide proportional voltage output responsive to pressure applied to it.

As shown in FIG. 4C, the controller 400a is operably connected to the display device 420 to control the display device 420 to display content. The controller 400a is communicatively connected to the input device 430 to receive signals from the input device 430 responsive to actuation of the input device 430. The controller 400a is operably connected to the light 440 to control operation of the light 440 (i.e., to turn the light 440 on and off). The controller 400a is communicatively connected to the pressure sensor 450 to receive signals from the pressure sensor 450 indicative of the pressure sensed by the pressure sensor 450. The controller 400a is operably connected to the actuator 242 to control movement of the actuator arm 242c from its rest position to its extended position (via directing electrical current to the solenoid 242b). The controller 400a is communicatively connected to the trigger-shaft sensor 250 to receive signals from the trigger-shaft sensor 250 responsive to actuation and de-actuation of the trigger-shaft sensor 250.

The housing 410 is mounted to an upper portion of the air director 310 of the air-directing assembly 300 such that the pressure sensor 450 is positioned to detect the pressure within the air conduit 312a defined by the body 312 of the air director 310 (which, then the inflator is in fluid communication with the inflatable object, is the same as the pressure within the inflatable object).

The power-source assembly 500 includes, is electrically connected to, or is configured to receive a power source (such as one or more replaceable or rechargeable batteries) configured to power the electronic components of the flow-control assembly 200 and the control assembly 400 (e.g., the actuator 242, the controller 400a, the communications interface 400b, the display device 420, the light 440, and the pressure sensor 450). In this example embodiment, the power-source assembly 500 includes a power source housing that is removably attached to the handle 130 of the inflator housing 100 and configured to house the power source.

Operation of the inflator 10 to inflate the dunnage bag is now described with reference to the inflation process 600 of the flowchart shown in FIG. 6 and FIGS. 5A-5F, which show part of the inflator 10. Here, although not shown, an implement in fluid communication with a pressurized air source is mechanically and fluidically connected to the air-directing portion 264 such that the pressurized air source is in fluid communication with the air-inlet bore 264ai of the air-directing portion 264 and the air-flow path 287fp of the flow-control-shaft support 287. Also, the air conduit 310 is in fluid communication with the dunnage bag.

Figure 5A:
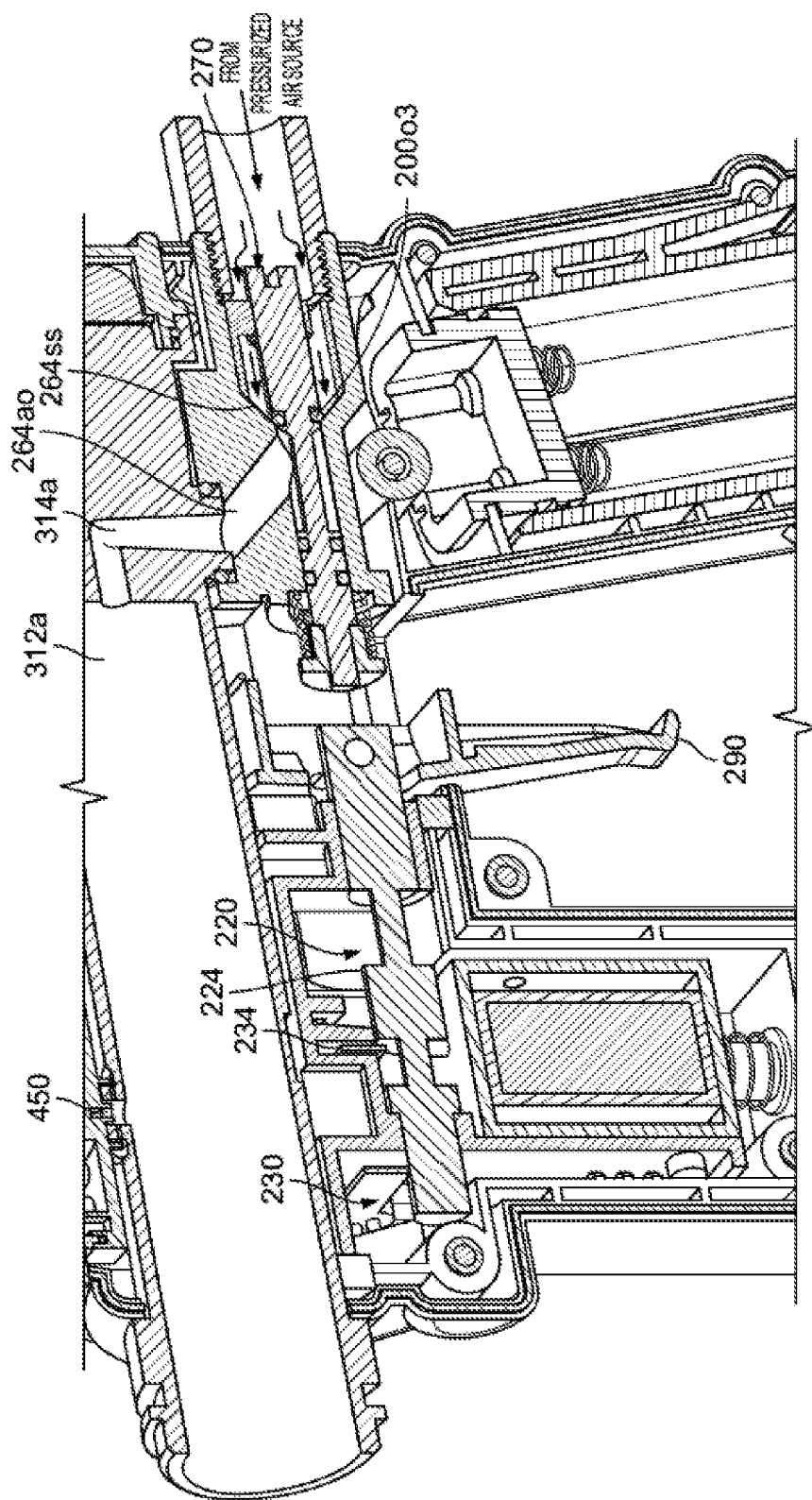
Figure 5C:
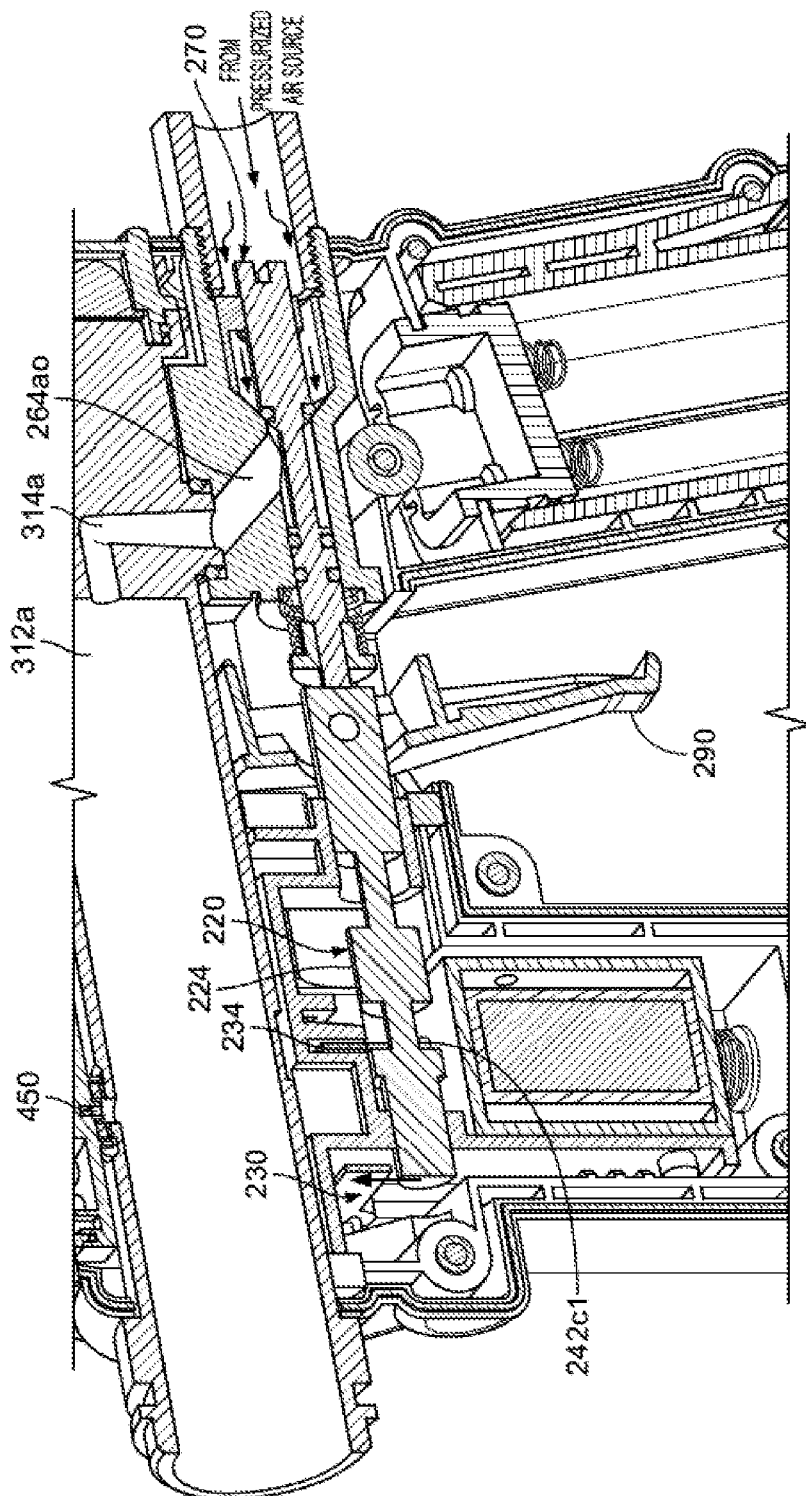
Figure 5D:
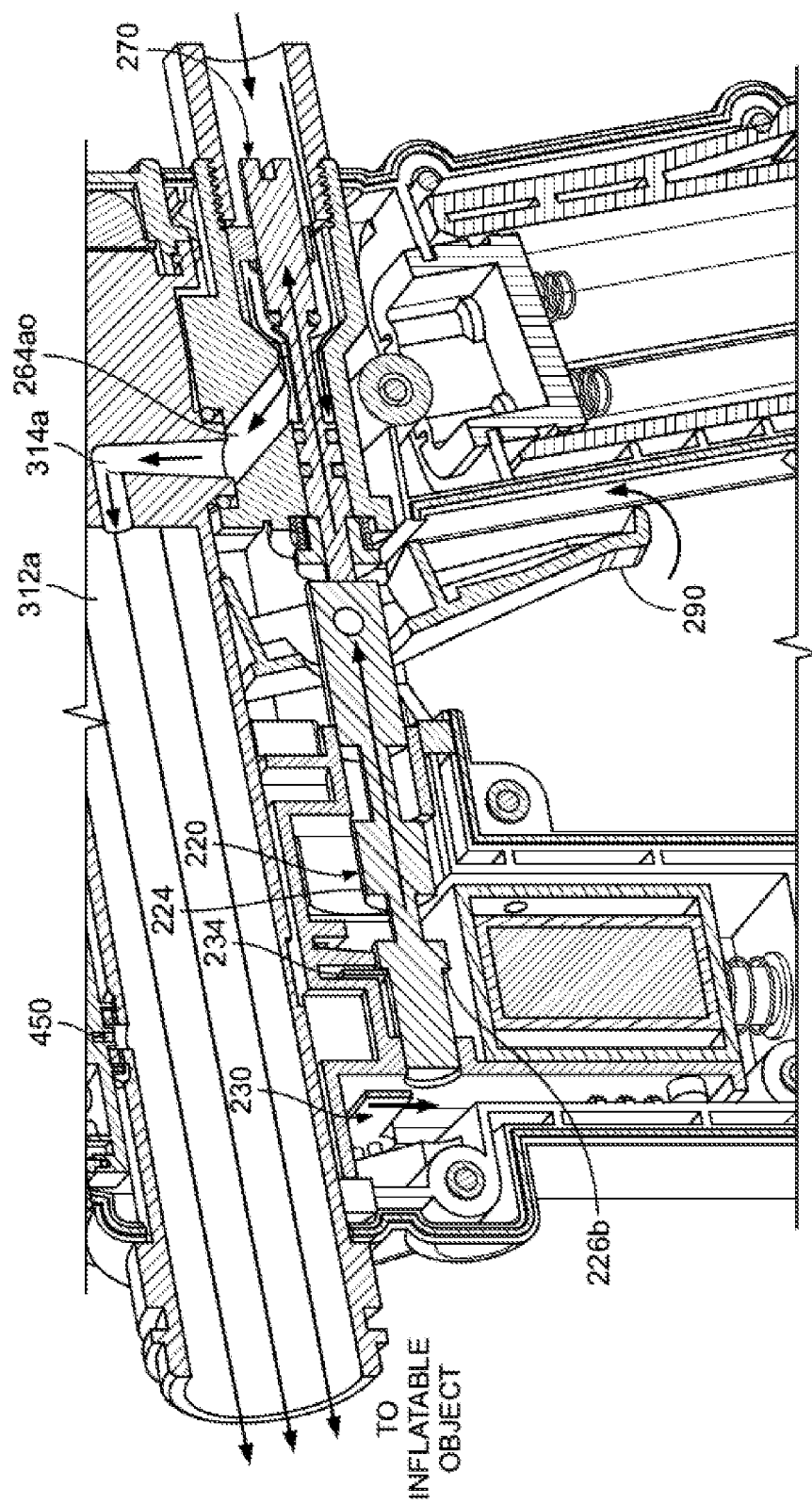
Figure 5E:
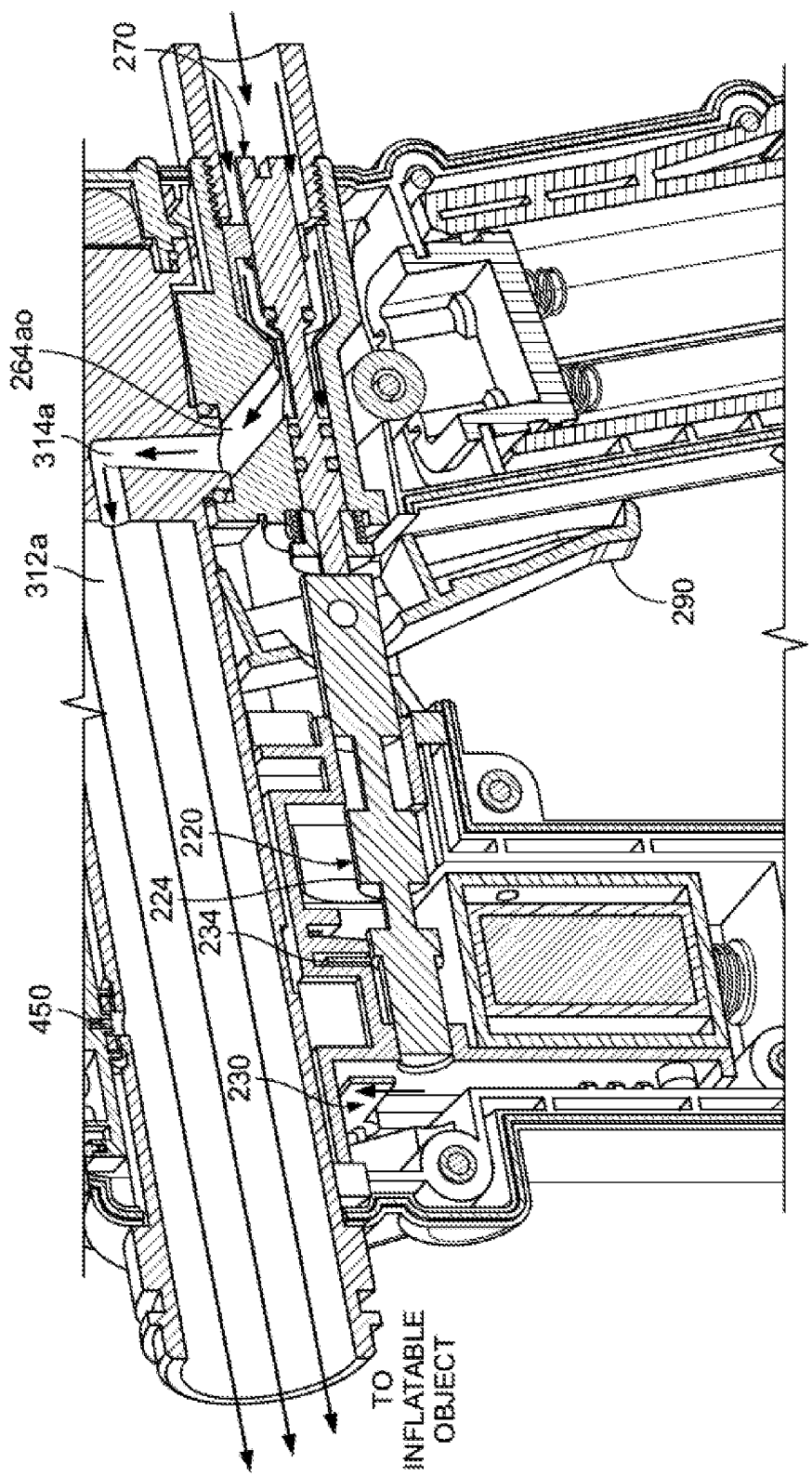

Initially, as shown in FIG. 5A, the trigger 290, the trigger shaft 220, and the flow-control shaft are in their respective rest positions. The user begins rotating the trigger 290 from its rest position to its actuated position, which causes the trigger shaft 220 to begin moving from its rest position to its actuated position, as block 602 indicates. As trigger shaft 220 reaches its intermediate position, the trigger-shaft sensor 250 detects the trigger shaft 220, as block 604 indicates. More specifically, as the trigger shaft 220 reaches its intermediate position, the sensed portion 224 of the trigger shaft 220 actuates the trigger-shaft sensor 250, which sends a corresponding signal to the controller 400a.

Responsive to receiving this signal, the controller 400a determines whether the pressure within the inflatable object is less than a preset pressure, as diamond 606 indicates. In this example embodiment, the controller 400a uses feedback received from the pressure sensor 450 to determine the pressure within the inflatable object and compares that pressure to a stored preset pressure. If the pressure within the inflatable object is not less than the preset pressure, the process 600 ends. In other words, the movement limiter 230 remains in its lock position and prevents the trigger shaft 220 from moving from its intermediate position to its actuated position.

If, on the other hand, the pressure within the inflatable object is less than the preset pressure, the actuator 242 moves the movement limiter 230 from its lock position to its release position to enable the trigger 290 and the trigger shaft 220 to continue moving to their actuated positions, as block 608 indicates and as shown in FIG. 5C. More specifically, the controller 400a directs an electrical current through the solenoid 242b, which causes the solenoid 242b to force the actuator arm 242c to move from its retracted position to its extended position to contact the arm 234 of the movement limiter 230 and move the movement limiter 230 from its lock position to its release position.

With the movement limiter 230 out of the way, continued rotation of the trigger 290 causes the trigger shaft 220 to contact the flow-control shaft 270 and begin moving the flow-control shaft from its rest position to its actuated position, as block 610 indicates, which disengages the third sealing element 200o3 from the sealing surface 264ss and enables pressurized air to begin flowing from the flow-control assembly 200 into the air-directing assembly 300 and from the air-directing assembly 300 into the inflatable object, as block 610 indicates. As this occurs, the Venturi effect causes the first and second wings 334 and 336 to move from their closed positions to open positions (FIG. 3E) to draw air from the atmosphere and direct that air into the inflatable object to speed inflation. The trigger 290, the trigger shaft 220, and the flow-control shaft 270 eventually reach their actuated positions, as block 612 indicates and as shown in FIG. 5D.

The actuator 242 enables the movement limiter 230 to move from its release position to its lock position, thereby locking the trigger 290, the trigger shaft 220, and the flow-control shaft 270 in their actuated positions, as block 614 indicates and as shown in FIG. 5D. Specifically, after a preset time period, the controller 400a stops directing electrical current through the solenoid 242b, which causes the actuator-arm-biasing element 242e to move the actuator arm 242c back to its retracted position. At this point, the user releases the trigger 290, and the trigger 290 and the trigger shaft 220 move slightly back toward their respective rest positions until the second movement-limiter-engaging surface 226b of the movement-limiting portion 226 of the trigger shaft 220 contacts the second arm 234 of the movement limiter 230, which prevents further movement of the trigger shaft 220 (and therefore the trigger 290 and the flow-control shaft 270) toward its rest position.

At this point the controller 400a continues to monitor the pressure within the inflatable object relative to the preset pressure, and the pressure within the inflatable object eventually reaches the preset pressure, as block 616 indicates. In response, the actuator 242 moves the movement limiter 230 from its lock position to its release position (as described above) to enable the trigger 290, the trigger shaft 220, and the flow-control shaft 270 to return to their rest positions, as block 618 indicates and as shown in FIG. 5E. Without the movement limiter 230 preventing such movement, the respective biasing elements bias the trigger 290, the trigger shaft 220, and the flow-control shaft 270 to their respective rest positions to stop the flow of pressurized air into the inflatable object, as block 620 indicates and as shown in FIG. 5F. The fact that the actuator needs only to pivot the movement limiter to enable inflation and later stop inflation means the actuator requires less power per inflation cycle than known battery-powered inflators that employ actuators that actively hold orifices open during inflation, which extends battery life.

As shown in FIG. 1D, the inflator 10 includes a manual override component that enables the user to configure the inflator 10 for purely manual operation, i.e., without the automatic shut-off functionality. The manual override component includes a dial 15 having a finger 15a and an inner component 18 having a movement-limiter engager 18a. The manual override component is supported by the first inflator housing component 110. More specifically, dial 15 and the inner component 18 are attached to one another via a fastener 19 such that they sandwich the first inflator housing component 110 with the dial 15 positioned outside the inflator housing 110 and the inner component 18 positioned within the inflator housing 110. The dial 15 and the inner component 18 rotate as one between a standard position (FIG. 1D) and an override position (not shown). When the manual override component is in the standard position, the movement-limiter engager 18A of the inner component 18 is spaced apart from the movement limiter 230. Rotating the manual override component from the standard position to the override position causes the movement-limiter engager 18A to contact the movement limiter 230 and move the movement limiter 203 from its lock position to its release position. This enables the user to pull the trigger regardless of whether the pressure within the inflatable object is at or above the preset pressure.

The preset pressure may be set in any suitable manner. In certain embodiments, the input device 430 is configured to enable the user to select the preset pressure. In other embodiments, the user can select the preset pressure using the external device, which later sends that preset pressure to the controller 400a via the communications interface 400b.

In various embodiments, the display device may display any of a variety of information, such as (but not limited to): the preset pressure, the detected pressure within the inflatable object, and/or the remaining battery life.

In various embodiments, responsive to the trigger-shaft sensor detecting that the trigger shaft has reached its intermediate position, the controller determines whether adequate battery life remains (e.g., determines whether battery life remaining is above a threshold) before controlling the actuator to move the movement limiter from its lock position to its release position. If the controller determines that adequate battery life does not remain, the controller does not move the movement limiter from its lock position to its release position. This prevents a situation in which the inflator will not have enough power to automatically stop inflation when the pressure within the inflatable object reaches the preset pressure, which could lead to over-inflation.

In various embodiments, if the controller determines that battery life falls below a preset threshold during inflation, the controller controls the actuator to move the movement limiter from its lock position to its release position to terminate inflation. This prevents a situation in which the inflator will not have enough power to automatically stop inflation when the pressure within the inflatable object reaches the preset pressure, which could lead to over-inflation.

In various embodiments, an inflator of the present disclosure comprises a housing; an air director supported by the housing and defining an air conduit fluidically connectable to an inflatable object; a pressure sensor configured to detect a pressure within the inflatable object; a trigger movable from a rest position to an actuated position to fluidically connect an air inlet to the air conduit; a movement limiter movable between a lock position in which the movement limiter prevents the trigger from moving from the rest position to the actuated position and a release position in which the movement limiter does not prevent the trigger from moving from the rest position to the actuated position; and a controller configured to cause the movement limiter to move from the lock position to the release position responsive to the pressure within the inflatable object being less than a preset pressure.

In certain such embodiments, the inflator further comprises an actuator operably connected to the movement limiter. The controller is configured to cause the actuator to move the movement limiter from at least one of: (1) the lock position to the release position; and (2) the release position to the lock position.

In certain such embodiments, the controller is configured to cause the actuator to move the movement limiter from only one of: (1) the lock position to the release position; and (2) the release position to the lock position.

In certain such embodiments, the inflator further comprises a movement-limiter-biasing element that biases the movement limiter to the other one of: (1) the lock position; and (2) the release position.

In certain such embodiments, the inflator further comprises a trigger shaft movable between a rest position and an actuated position, wherein: (1) movement of the trigger from its rest position to its actuated position causes the trigger shaft to move from its rest position to its actuated position; and (2) movement of the trigger from its actuated position to its rest position causes the trigger shaft to move from its actuated position to its rest position; and a trigger-shaft sensor configured to sense when the trigger shaft has reached an intermediate position between the rest position and the actuated position.

In certain such embodiments, the trigger-shaft sensor is configured to directly sense the trigger shaft when the trigger shaft has reached the intermediate position.

In certain such embodiments, the controller is further configured to, responsive to the pressure within the inflatable object being less than the preset pressure when the trigger-shaft sensor senses that the trigger shaft has reached the intermediate position, control the actuator to move the movement limiter to its release position.

In certain such embodiments, the inflator further comprises a flow-control shaft comprising a sealing element, wherein the flow-control shaft is movable between a rest position in which the sealing element sealingly engages a sealing surface such that air cannot flow from the air inlet to the air conduit and an actuated position in which the sealing element does not sealingly engage the sealing surface such that the air inlet is in fluid communication with the air conduit.

In certain such embodiments, movement of the trigger from its rest position to its actuated position causes the flow-control shaft to move from its rest position to its actuated position.

In certain such embodiments, the inflator further comprises an actuator operably connected to the movement limiter, wherein the controller is configured to cause the actuator to move the movement limiter from at least one of: (1) the lock position to the release position; and (2) the release position to the lock position.

In certain such embodiments, the inflator further comprises a trigger shaft movable between a rest position and an actuated position, wherein: (1) movement of the trigger from its rest position to its actuated position causes the trigger shaft to move from its rest position to its actuated position; and (2) movement of the trigger from its actuated position to its rest position causes the trigger shaft to move from its actuated position to its rest position; and a trigger-shaft sensor configured to sense when the trigger shaft has reached an intermediate position between the rest position and the actuated position.

In certain such embodiments, the controller is further configured to, responsive to the pressure within the inflatable object being less than the preset pressure when the trigger-shaft sensor senses that the trigger shaft has reached the intermediate position, control the actuator to move the movement limiter to its release position.

In certain such embodiments, movement of the trigger shaft from its rest position to its actuated position causes the flow-control shaft to move from its rest position to its actuated position.

In certain such embodiments, the flow-control shaft is in its rest position when the trigger shaft is in its intermediate position.

In certain such embodiments, the inflator further comprises a flow-control-shaft-biasing element that biases the flow-control shaft to its rest position, a trigger-biasing element that biases the trigger and the trigger shaft to their respective rest positions, and a movement-limiter-biasing element that biases the movement limiter to its lock position.

In certain such embodiments, the controller is further configured to cause the movement limiter to move from the lock position to the release position responsive to the pressure within the inflatable object reaching the preset pressure.

In various embodiments, a method of the present disclosure of operating an inflator to inflate an inflatable object comprises detecting, by a pressure sensor, a pressure within the inflatable object; monitoring, by a controller, the pressure within the inflatable object; and responsive to the pressure within the inflatable object being less than a preset pressure, causing, by the controller, a movement limiter to move from: (1) a lock position in which the movement limiter prevents a trigger from moving from a rest position to an actuated position to fluidically connect an air inlet to the air conduit; to (2) a release position in which the movement limiter does not prevent the trigger from moving from the rest position to the actuated position.

In certain such embodiments, causing the movement limiter to move from the lock position to the release position comprises controlling, by the controller, an actuator to move the movement limiter from the lock position to the release position.

In certain such embodiments, the method further comprises monitoring, by the controller, for an actuation of a trigger-shaft sensor; and responsive to a trigger shaft that is operably connected to the trigger actuating the trigger-shaft sensor, determining, by the controller, whether the pressure within the inflatable object is less than the preset pressure.

In certain such embodiments, the method further comprises, responsive to the pressure within the inflatable object reaching the preset pressure, causing, by the controller, the movement limiter to move from the lock position to the release position.

We claim:

1. An inflator comprising:
a housing;
an air director supported by the housing and defining an air conduit fluidically connectable to an inflatable object;
a pressure sensor configured to detect a pressure within the inflatable object;
a trigger movable from a rest position to an actuated position to fluidically connect an air inlet to the air conduit;
a movement limiter movable between a lock position in which the movement limiter prevents the trigger from moving from the rest position to the actuated position and a release position in which the movement limiter does not prevent the trigger from moving from the rest position to the actuated position; and
a controller configured to cause the movement limiter to move from the lock position to the release position responsive to the pressure within the inflatable object being less than a preset pressure.

2. The inflator of claim 1, further comprising an actuator operably connected to the movement limiter, wherein the controller is configured to cause the actuator to move the movement limiter from at least one of: (1) the lock position to the release position; and (2) the release position to the lock position.

3. The inflator of claim 1, further comprising an actuator operably connected to the movement limiter, wherein the controller is configured to cause the actuator to move the movement limiter from only one of: (1) the lock position to the release position; and (2) the release position to the lock position.

4. The inflator of claim 3, further comprising a movement-limiter-biasing element that biases the movement limiter to the other one of: (1) the lock position; and (2) the release position.

5. The inflator of claim 2, further comprising:
a trigger shaft movable between a rest position and an actuated position, wherein: (1) movement of the trigger from its rest position to its actuated position causes the trigger shaft to move from its rest position to its actuated position; and (2) movement of the trigger from its actuated position to its rest position causes the trigger shaft to move from its actuated position to its rest position; and
a trigger-shaft sensor configured to sense when the trigger shaft has reached an intermediate position between the rest position and the actuated position.

6. The inflator of claim 5, wherein the trigger-shaft sensor is configured to directly sense the trigger shaft when the trigger shaft has reached the intermediate position.

7. The inflator of claim 5, wherein the controller is further configured to, responsive to the pressure within the inflatable object being less than the preset pressure when the trigger-shaft sensor senses that the trigger shaft has reached the intermediate position, control the actuator to move the movement limiter to its release position.

8. The inflator of claim 1, further comprising a flow-control shaft comprising a sealing element, wherein the flow-control shaft is movable between a rest position in which the sealing element engages a sealing surface such that air cannot flow from the air inlet to the air conduit and an actuated position in which the sealing element does not engage the sealing surface such that the air inlet is in fluid communication with the air conduit.

9. The inflator of claim 8, wherein movement of the trigger from its rest position to its actuated position causes the flow-control shaft to move from its rest position to its actuated position.

10. The inflator of claim 9, further comprising an actuator operably connected to the movement limiter, wherein the controller is configured to cause the actuator to move the movement limiter from at least one of: (1) the lock position to the release position; and (2) the release position to the lock position.

11. The inflator of claim 10, further comprising:
a trigger shaft movable between a rest position and an actuated position, wherein: (1) movement of the trigger from its rest position to its actuated position causes the trigger shaft to move from its rest position to its actuated position; and (2) movement of the trigger from its actuated position to its rest position causes the trigger shaft to move from its actuated position to its rest position; and
a trigger-shaft sensor configured to sense when the trigger shaft has reached an intermediate position between the rest position and the actuated position.

12. The inflator of claim 11, wherein the controller is further configured to, responsive to the pressure within the inflatable object being less than the preset pressure when the trigger-shaft sensor senses that the trigger shaft has reached the intermediate position, control the actuator to move the movement limiter to its release position.

13. The inflator of claim 12, wherein movement of the trigger shaft from its rest position to its actuated position causes the flow-control shaft to move from its rest position to its actuated position.

14. The inflator of claim 13, wherein the flow-control shaft is in its rest position when the trigger shaft is in its intermediate position.

15. The inflator of claim 13, further comprising a flow-control-shaft-biasing element that biases the flow-control shaft to its rest position, a trigger-biasing element that biases the trigger and the trigger shaft to their respective rest positions, and a movement-limiter-biasing element that biases the movement limiter to its lock position.

16. The inflator of claim 1, wherein the controller is further configured to cause the movement limiter to move from the lock position to the release position responsive to the pressure within the inflatable object reaching the preset pressure.

17. A method of operating an inflator to inflate an inflatable object, the method comprising:
detecting, by a pressure sensor, a pressure within the inflatable object;
monitoring, by a controller, the pressure within the inflatable object; and
responsive to the pressure within the inflatable object being less than a preset pressure, causing, by the controller, a movement limiter to move from: (1) a lock position in which the movement limiter prevents a trigger from moving from a rest position to an actuated position to fluidically connect an air inlet to the air conduit; to (2) a release position in which the movement limiter does not prevent the trigger from moving from the rest position to the actuated position.

18. The method of claim 17, wherein causing the movement limiter to move from the lock position to the release position comprises controlling, by the controller, an actuator to move the movement limiter from the lock position to the release position.

19. The method of claim 17, further comprising:
monitoring, by the controller, for an actuation of a trigger-shaft sensor; and responsive to a trigger shaft that is operably connected to the trigger actuating the trigger-shaft sensor, determining, by the controller, whether the pressure within the inflatable object is less than the preset pressure.

20. The method of claim 17, further comprising, responsive to the pressure within the inflatable object reaching the preset pressure, causing, by the controller, the movement limiter to move from the lock position to the release position.

* * * * *